(12) United States Patent
Kato et al.

(10) Patent No.: US 7,059,785 B2
(45) Date of Patent: Jun. 13, 2006

(54) COMPOSITE PRINTER AND SCAN IMAGE COPYING METHOD

(75) Inventors: Takashi Kato, Nagano-ken (JP); Junya Yada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/489,244

(22) PCT Filed: Sep. 12, 2002

(86) PCT No.: PCT/JP02/09328

§ 371 (c)(1),
(2), (4) Date: Mar. 11, 2004

(87) PCT Pub. No.: WO03/026277

PCT Pub. Date: Mar. 27, 2003

(65) Prior Publication Data

US 2004/0247359 A1 Dec. 9, 2004

(30) Foreign Application Priority Data

Sep. 12, 2001 (JP) .............................. 2001-276543
Dec. 28, 2001 (JP) .............................. 2001-399255

(51) Int. Cl.
*B41J 11/44* (2006.01)

(52) U.S. Cl. ............................ 400/62; 400/61; 400/70; 400/76

(58) Field of Classification Search ................. 400/62, 400/76, 70, 61; 358/1.2, 474
See application file for complete search history.

(56) References Cited

U.S. PATENT DOCUMENTS

| | | | |
|---|---|---|---|
| 3,831,478 A * | 8/1974 | Wright et al. ................. 83/368 |
| 4,647,187 A * | 3/1987 | Zahn et al. .................... 355/21 |
| 4,727,431 A | 2/1988 | Nakamura et al. | |
| 4,734,785 A | 3/1988 | Takei et al. | |
| 4,837,635 A | 6/1989 | Santos | |
| 4,870,500 A | 9/1989 | Nagashima | |
| 5,497,217 A * | 3/1996 | Yoshida ........................ 355/77 |
| 5,600,412 A * | 2/1997 | Connors ....................... 399/81 |
| 6,614,564 B1 * | 9/2003 | Sakaguchi ................... 358/487 |
| 6,834,929 B1 * | 12/2004 | Adams et al. ................ 347/19 |
| 2004/0028450 A1 * | 2/2004 | Jung .......................... 400/709 |

FOREIGN PATENT DOCUMENTS

| | | |
|---|---|---|
| EP | 1 059 168 A | 12/2000 |
| JP | 1-229870 A | 5/1989 |
| JP | 5-176156 A | 7/1993 |
| JP | 11-69096 A | 3/1999 |
| JP | 11-231432 A | 8/1999 |
| JP | 11-298725 A | 10/1999 |
| JP | 2000-184145 A | 6/2000 |
| JP | 2001-218025 A | 8/2001 |
| JP | 2003-53953 A | 2/2003 |

* cited by examiner

*Primary Examiner*—Minh Chau
(74) *Attorney, Agent, or Firm*—Sughrue Mion, PLLC

(57) ABSTRACT

It is an object of the present invention, when using image scanner(s) to capture image(s) of original(s) and using printer(s) to print same, to enable four-sided borderless copying such that margin(s) do not appear on printout(s). An image scanner might capture an image corresponding to scan region 263 which might be somewhat larger than original 262. Image processing circuitry might then enlarge an image corresponding to scan region 266 (arrow 279), converting it into enlarged image 271. Within enlarged image 271, the image of original 262 might have been enlarged so as to become image 273, which might be somewhat larger than printing paper 274. This enlarged original image 273 which would be present within enlarged image 271 might then be printed by a printer.

18 Claims, 21 Drawing Sheets

COMPOSITE PRINTER AND SCAN IMAGE COPYING METHOD

FIELD OF ART

The present invention pertains to a hybrid printer and a scan image copying method.

BACKGROUND ART

In recent years, depending upon the printer in question, it has in some cases become possible to carry out what is called four-sided borderless printing—in which printing is carried out over the entirety of the printed surface of the printing paper—of images based on data subject to printing. Furthermore, standalone printers capable of causing prescribed data to be printed on printing paper in standalone fashion without the need to connect to host apparatuses—representative among which are personal computers and the like—have come into widespread use. Also appearing on the scene are hybrid printers in which scanner capabilities have been further added to such standalone printers such that images captured by means of scanner mechanisms can be printed onto printing paper in direct fashion by means of printer mechanisms without intervention by host apparatuses.

With a hybrid printer, because connection to a host apparatus is not required, a user might typically place an original on an original stage and operate a control panel provided on a main body so as to give print instructions to the standalone printer, and this might then cause same to be scanned by the scanner mechanism, following which printing thereof by the printer mechanism might be automatically carried out, as a result of which print results could be obtained.

It has been the case with such hybrid printers, when printing is carried out as a result of instruction to cause printer mechanism to directly perform four-sided borderless printing of image captured from original by scanner mechanism onto printing paper identical in size to original, that, because scan region capable of being captured by scan mechanism is smaller than entire original surface region by amount corresponding to prescribed margins (hereinafter "scanner margins"), such scanner margins appear in unabated fashion on printing paper, making it impossible to obtain satisfactory print results. Improvement of mechanical precision in connection with both scanning and printing in order to adjust such discrepancy between scan regions of scanner mechanism and print region of printer mechanism has been a problem from the standpoint of product cost. Particularly with the aforementioned standalone-printer sort of hybrid printer, because individual users represent the primary target of sales activities, there is a strong desire to keep product costs to a minimum.

DISCLOSURE OF INVENTION

It is therefore an object of the present invention to make it possible in the context of hybrid printer to carry out four-sided borderless printing without occurrence of margin region even when image captured by scanner mechanism is printed by printer mechanism.

A hybrid printer in accordance with one aspect of the present invention comprises an original stage; a scanner scanning scan region of the original stage and outputting image data corresponding to the scan region; a controller controlling the scan region; an image processor processing the image data output from the scanner; and a printer using the image data output by the processor to carry out printing at a print medium. The controller may be capable of controlling the scan region so as to cause the scan region to match or be larger than an original region detected or assumed to exist at the original stage in order to permit the scan region to encompass the original region. The processor may be capable of enlarging, so as to be larger than the size of the print medium, the image data corresponding to the original region encompassed by the image data corresponding to the scan region from the scanner. The print engine may be capable of carrying out printing at the print medium by using the image data corresponding to the original region enlarged by the processor so as to be larger than the size of the print medium to.

In a preferred embodiment, processing may be carried out in which the original region of the original stage is assumed to exist based on a user-specified original size. Furthermore, the controller may be capable of controlling the scan region so as to cause the scan region to be a region enlarged outward to accommodate a prescribed top, bottom, left, and right margin around the assumed original region.

In another preferred embodiment, the scanner may be capable of carrying out prescanning in which, prior to scanning of the scan region, the original stage is scanned and the original stage image data is output. Furthermore, an actual original region on the original stage may be detected based on original stage image data obtained as a result of such prescanning. Furthermore, the controller may be capable of controlling the scan region so as to cause the scan region to match the detected original region or to be a region enlarged outward to accommodate a prescribed top, bottom, left, and right margin around the detected original region.

Still another embodiment may further comprise a print start controller controlling print start location of the print engines in correspondence to magnification at which the image data corresponding to the original region is enlarged by the processor.

A hybrid printer in accordance with another aspect of the present invention comprises an original stage; a scanner scanning a scan region of the original stage and outputting image data corresponding to the scan region; a controller controlling the scan region; image processor processing the image data output from the scanner; and a printer using the image data output by the processor to carry out printing at a print medium. The controller may be capable of controlling the scan region so as to cause the scan region to be smaller than an original region detected or assumed to exist at the original stage in order to permit the original region to encompass the scan region. The processor may be capable of enlarging, so as to be larger than the size of the print medium, the image data corresponding to the scan region from the scanner. The print engine may be capable of using the image data corresponding to the scan region enlarged by the processor so as to be larger than the size of the print medium to carry out printing at the print medium.

In a preferred embodiment, the controller controls the scan region so as to cause the scan region to be a region reduced inward from the original region by prescribed scanner margins. Furthermore, the processor enlarges the image data corresponding to the scan region so as to cause the image data corresponding to the scan region to be the size obtainable by enlarging outward to accommodate the prescribed printer margin around the size of the print medium. Here, the scanner margin may be set so as to be smaller than the printer margin.

Still another embodiment may further comprise a print start controller controlling a print start location of the print engine in correspondence to a magnification at which the image data corresponding to the original region is enlarged by the processor.

A hybrid printer in accordance with yet another aspect of the present invention comprises an original stage; a scanner scanning a scan region of the original stage and outputting image data corresponding to the scan region; processor processing the image data corresponding to the scan region from the scanner and creating print image data; a printer using the print image data from the processor to carry out printing at a print medium; and a selector selecting a mode from among at least two of a plurality of varieties of copy modes including a normal copy mode, a borderless copy mode, and a unity magnification mode. Furthermore, the processor, (1) when the normal copy mode is selected, creates, either with or without alteration of the size of the image data corresponding to the scan region, the print image data in such manner as to cause it to be smaller in size than the size of the print medium;

(2) when the borderless copy mode is selected, creates, with alteration of the size of the image data corresponding to the scan region, the print image data in such manner as to cause it to be larger in size than the size of the print medium; and/or (3) when the unity magnification copy mode is selected, creates the print image data without alteration of the size of the image data corresponding to the scan region.

A preferred embodiment may further comprise a print start controller controlling a print start location of the print engines in correspondence to the mode selected by the selector.

BEST MODE FOR CARRYING OUT INVENTION

Next, embodiments of the present invention will be described with reference to the drawings.

Figure 1:
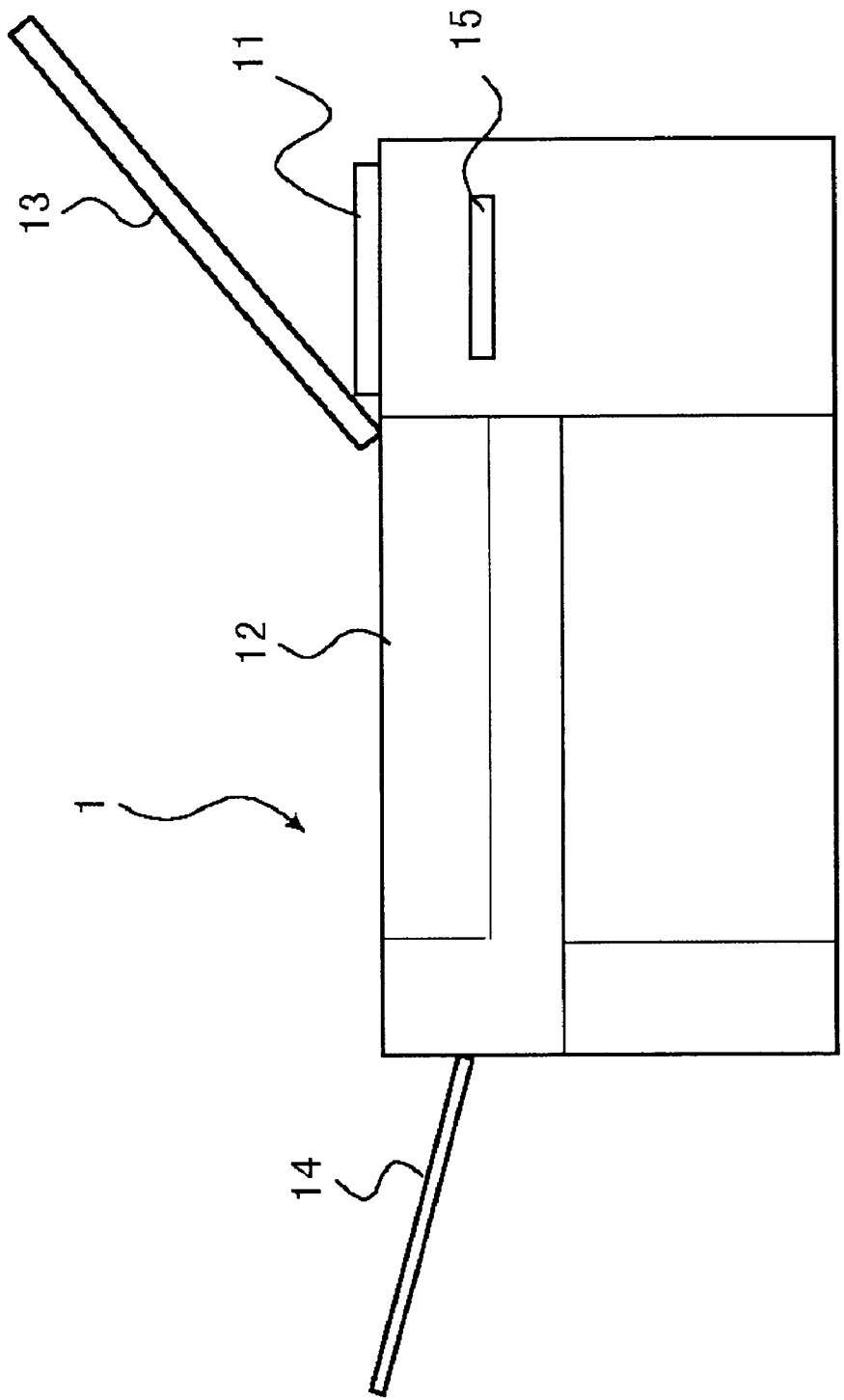
FIG. 1 is a drawing showing the external appearance of a hybrid printer associated with an embodiment of the present invention.

FIG. 1 is a drawing showing the external appearance of a hybrid printer associated with a first embodiment of the present invention. This hybrid printer 1 has scanner functionality by which it captures document(s) or other such original(s) in the form of scan image data, and has printer functionality by which it converts scan image data, application data, and/or other such data subject to printing into print image data and carries out printing on printing paper. Provided at the interior of hybrid printer 1 there is or are control apparatus(es), control being carried out in comprehensive fashion and various functions being implemented thereby.

As shown in same drawing, provided at the top of the main body of hybrid printer 1 there are liquid crystal panel(s) and various buttons forming user interface(s) 11. User(s) can, by way of this user interface 11, scan original(s), give print instructions, enter various settings related to conditions in connection with scan, settings related to printing conditions, and so forth.

Furthermore, provided at the top of the main body of hybrid printer 1 there are original stage(s) 12, having glass surface(s) for placement of original(s), and cover(s) 13. While not shown in the drawing, provided beneath original stage(s) 12 there are light source(s) for irradiating, with light, original(s) placed on glass surface(s) of original stage(s) 12, and optical sensor(s) receiving such light after it is reflected. Upon accepting image scan instruction(s) and/or printing instruction(s) from user(s) by way of user interface(s) 11, hybrid printer 1 captures original(s) placed on original stage(s) 12 in the form of scan image data which is stored in prescribed data format(s) in internal memory or memories. Hybrid printer 1 then carries out printing on printing paper based on scan image data stored in memory or memories. Following printing, hybrid printer 1 discharges printing paper into discharge tray 14.

Furthermore, provided at the front of the main body of hybrid printer 1 there are card slot(s) 15 serving as external interface(s). Card slot(s) 14 might, for example, conform to PCMCIA specification(s), and might be constructed so as to permit insertion and removal of memory card(s) (not shown) conforming to such specification(s). When a memory card is, for example, inserted in card slot 15 and presence thereof has been detected, hybrid printer 1 might display a message at liquid crystal panel(s) soliciting instruction(s) for execution of printing. In response thereto, a user might perform operations for setting of printing conditions as necessary (or not) and might give print instruction(s). Hybrid printer 1, upon accepting print instruction(s) from user(s), would read image-containing data recorded on memory card(s) and carry out printing on printing paper. Following printing, hybrid printer 1 would discharge printing paper into discharge tray 14.

Figure 2:
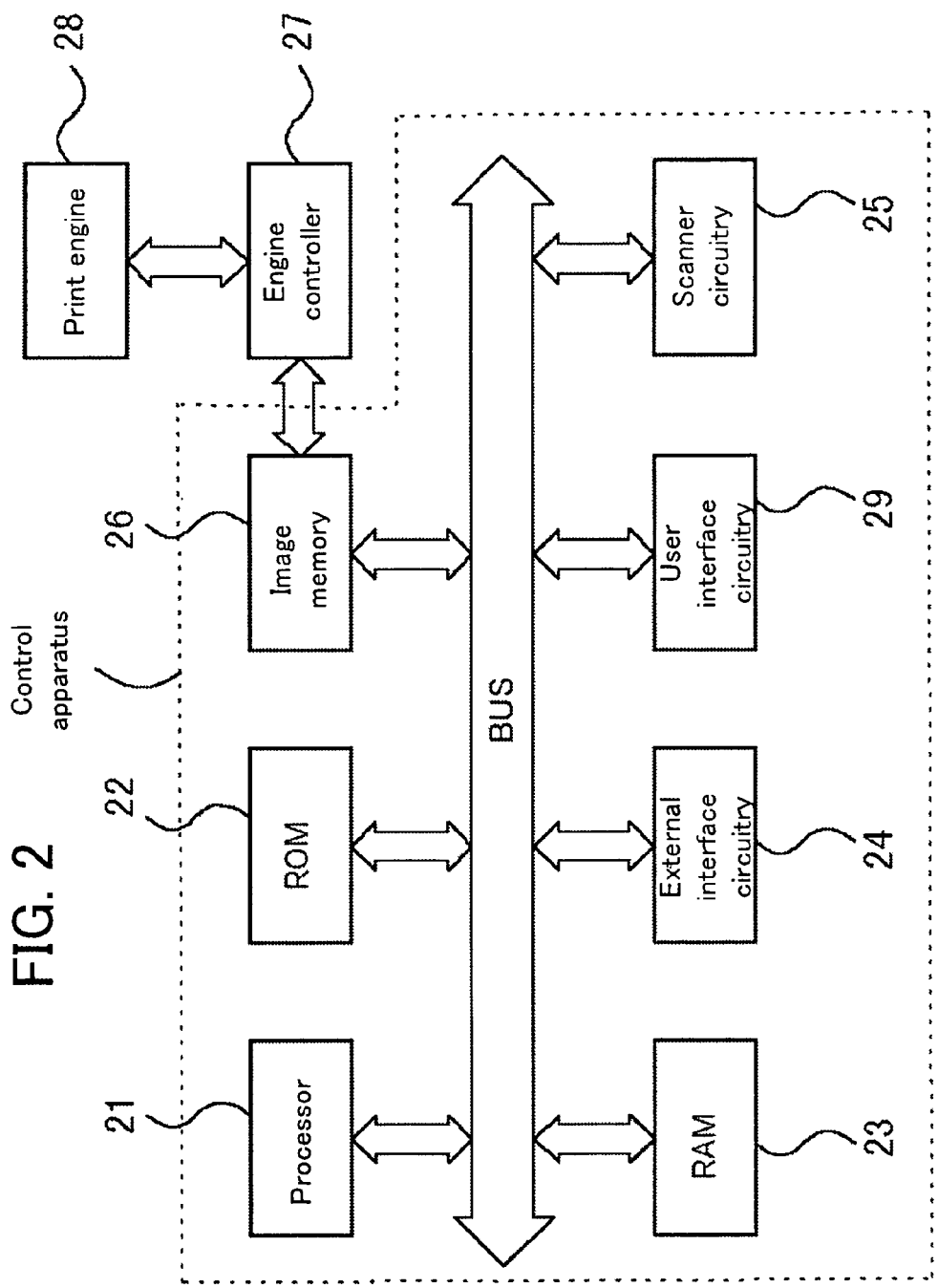
FIG. 2 is a block diagram showing the hardware configuration of hybrid printer 1 associated with an embodiment of the present invention.

FIG. 2 is a block diagram showing the hardware configuration of hybrid printer 1 associated with the present embodiment. Processor(s) 21 execute various control programs. That is, execution by processor(s) 21 of various programs stored in ROM(s) 22 causes prescribed functionality or functionalities of hybrid printer 1 to be implemented in conjunction with other hardware. In the present embodiment, at least user interface functionality, scanner functionality, image creation functionality, print control functionality, and the like are implemented.

External interface circuitry 24 is for making it possible for processor(s) 21 to access memory card(s) 2 present in card slot(s) 15. After image-containing data stored on memory card(s) is loaded into RAM(s) 23 by way of this external interface circuitry 24, processor(s) 21 create image data based on that image-containing data in accordance with any printing conditions which may have been set.

Scanner circuitry 25 is for scanning original(s) placed on original stage(s) 12 and capturing same in the form of scan image data. After scan image data captured by this scanner circuitry 29 is loaded into RAM(s) 23, processor(s) 21 create print image data based on scan image data in accordance with any printing conditions which may have been set. Scanner circuitry 25 employed may be such as will accommodate image input technique(s) (reducing-type optical technique(s) in which lens(es) are used to scan reduced image(s) of original(s), contact-type optical technique(s) in which CCD(s) as wide as original(s) are used to scan original(s) at unity magnification, etc.). Furthermore, scanner circuitry 25 employed may be such as will accommodate prescribed method(s) for scanning of original color information (method(s) involving combination of monochromatic CCD(s) and color filter(s), method(s) employing color linear CCD(s) which themselves have color separating capability, etc.).

Image memory or memories 26 are for storing print image data which has been created. Engine controller(s) 27 control operation of print engine(s) 28, and at the same time, read print image data stored in image memory or memories 26 and supply same to print engine(s) 28. Activation of engine controller(s) 27 might, for example, be triggered by command(s) to execute printing sent from processor(s) 21 at time(s) when print image data of a prescribed width of band have been expanded, the expanded data being written to image memory or memories 26.

Print engine(s) 28—comprising, for example, paper feed mechanism(s), printhead(s), and so forth—are for carrying out printing on paper or other such print medium or media. Print engine(s) 28 employed may be such as will accommodate use in such types of printers as laser printers, serial printers, and/or the like.

User interface circuitry 29 is for controlling user interface 11, which is implemented by means of liquid crystal panel(s) and various buttons.

Figure 3:
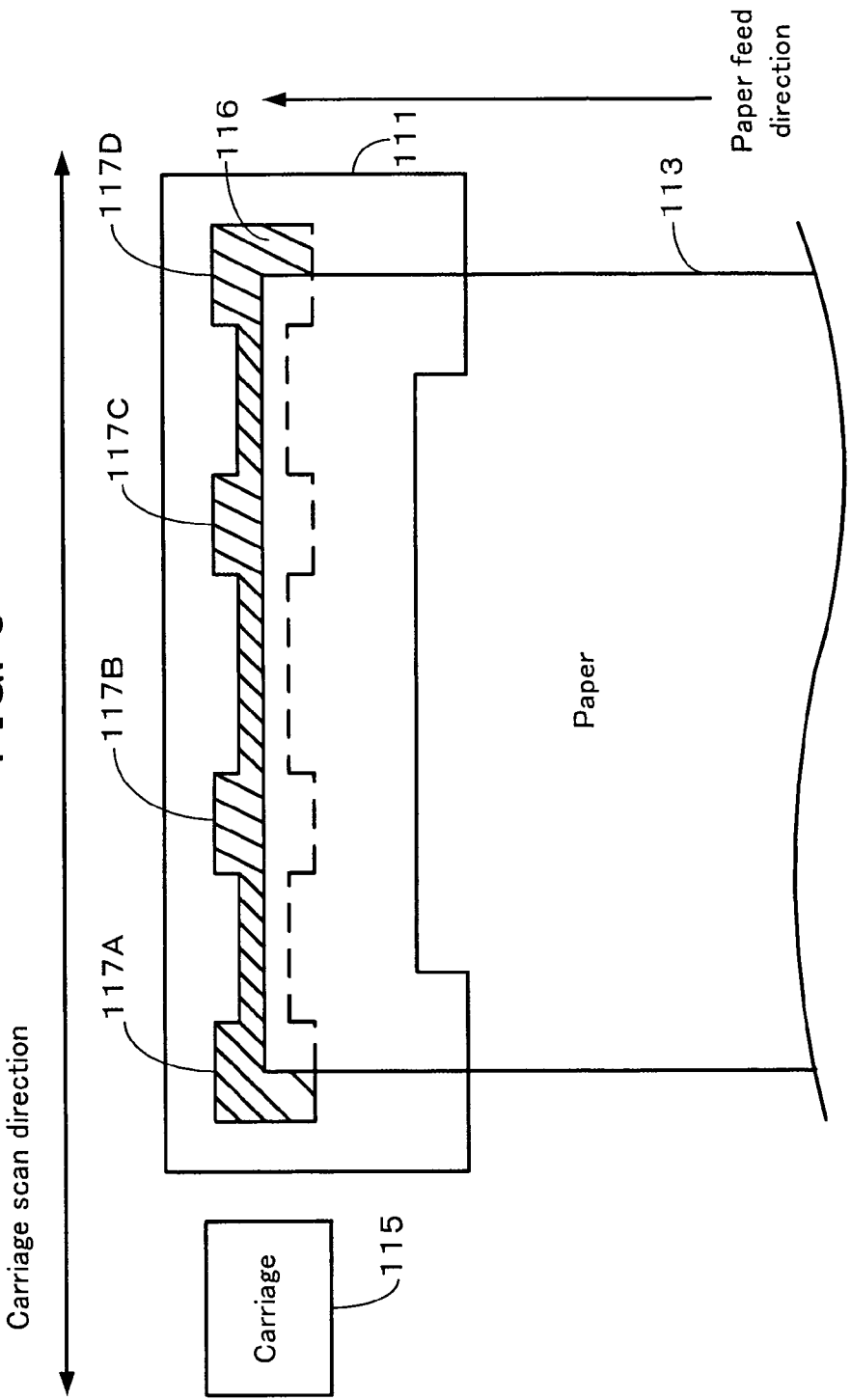
FIG. 3 is a drawing showing characteristic portions associated with borderless printing.

FIG. 3 is a drawing showing, in schematic fashion, characteristic portions of a print mechanism accommodating borderless printing.

Provided in the discharge path of paper 113 which is fed by paper feed mechanism(s) within hybrid printer 1 is/are platen(s) 111 supporting paper 113 from the side thereof opposite the side thereof which receives the jetted ink. Embedded within platen(s) 111, at location(s) facing path(s) of travel of carriage(s) 115, is/are ink absorber(s) 116 for absorbing ink jetted from printhead(s) in carriage(s) 115.

Ink absorber 116—being, for example, urethane resin—is long in a direction parallel to the direction of travel of carriage 115 and is of constant width in a direction parallel to the paper feed direction. This being the case, even if ink is jetted above the top edge or below the bottom edge of paper 113 in accompaniment to reciprocating travel of carriage 115, because such ink will be received by and absorbed by ink absorber 116, platen 111 will not be soiled by ink jetted beyond the edges of paper 113.

Furthermore, at ink absorber 116, right edge portion 117A, left edge portion 117D, and prescribed portions 117B and 117C therebetween, are widened (i.e., elongated) in the paper feed direction and in the direction opposite thereto. This being the case, even if ink is jetted to the left of the left edge or to the right of the right edge of paper 113 in accompaniment to reciprocating travel of carriage 115, because such ink will be received by and absorbed by ink absorber 116, platen 111 will not be soiled by ink jetted beyond the edges of paper 113. Moreover, because the widened portion(s) are only specific portions 117A through 117D of ink absorber 116, the paper size(s) for which it is possible to carry out borderless printing without soiling of platen 111 may be all of the plurality of paper sizes which hybrid printer 1 is capable of accommodating; or alternatively, may be limited to a number of specific sizes, e.g., standard A4 size (210 mm×297 mm), B5 size (182 mm×257 mm), and the Japanese postcard size (100 mm×148 mm). If the size of paper 113 is, for example, A4 size, ink absorber 116 would absorb ink jetted beyond the left edge and right edge of paper 113 at portions 117A and 117D; if the size of paper 113 is, for example, B5 size, ink absorber 116 would absorb ink jetted beyond the left edge and right edge of paper 113 at portions 1171B and 117D; and if the size of paper 113 is, for example, Japanese postcard size, ink absorber 116 would absorb ink jetted beyond the left edge and right edge of paper 113 at portions 117C and 117D.

In accordance with a constitution such as the foregoing, soiling of platen 11 by ink jetted beyond paper 113 does not occur even when borderless printing is carried out (note that more specific detail with respect to the constitution described with reference to FIG. 3 can be found in the specifications and drawings attached to patent applications previously filed by the present applicant (Japanese Patent Application Nos. 2000-275965 and 2000-295861). Borderless printing may be carried out responsive to user request when in hybrid printer mode(s) and/or printer mode(s), described below.

In the present embodiment, printing is carried out with print magnification being adjusted during creation of print image data based on scan image data captured under the control of scanner circuitry 25 in such manner as to cause printed image(s) to be enlarged relative to original image(s) by amount(s) such as would not appear visually strange to user(s).

In the event that scan region(s) captured by scanner mechanism(s) are to be formed so as to, for example, include region(s) outside periphery or peripheries of original(s), print magnification might be adjusted so as to yield enlargement such as will cause perimeter boundary portion(s) of original(s) to correspond to perimeter boundary portion(s) of printing paper. Furthermore, in the event that scan region(s) to be captured by scanner mechanism(s) are to be formed at region(s) inside perimeter(s) of original(s), adjustment of the print magnification might be carried out so as to yield enlargement such as will cause perimeter boundary portion(s) of such region(s) inside perimeter(s) to correspond to outside edge boundary portion(s) of printing paper. However, in either case, it is preferred not that the two perfectly overlap and match, but that, allowing for error(s), outside edge boundary portion(s) of printing paper be slightly exceeded. Print magnification is defined based on the relationship between scan region(s) and actual original size(s), a print magnification of on the order of 104% to 106% being preferred, and a print magnification of on the order of 105% being still more preferred.

Figure 4:
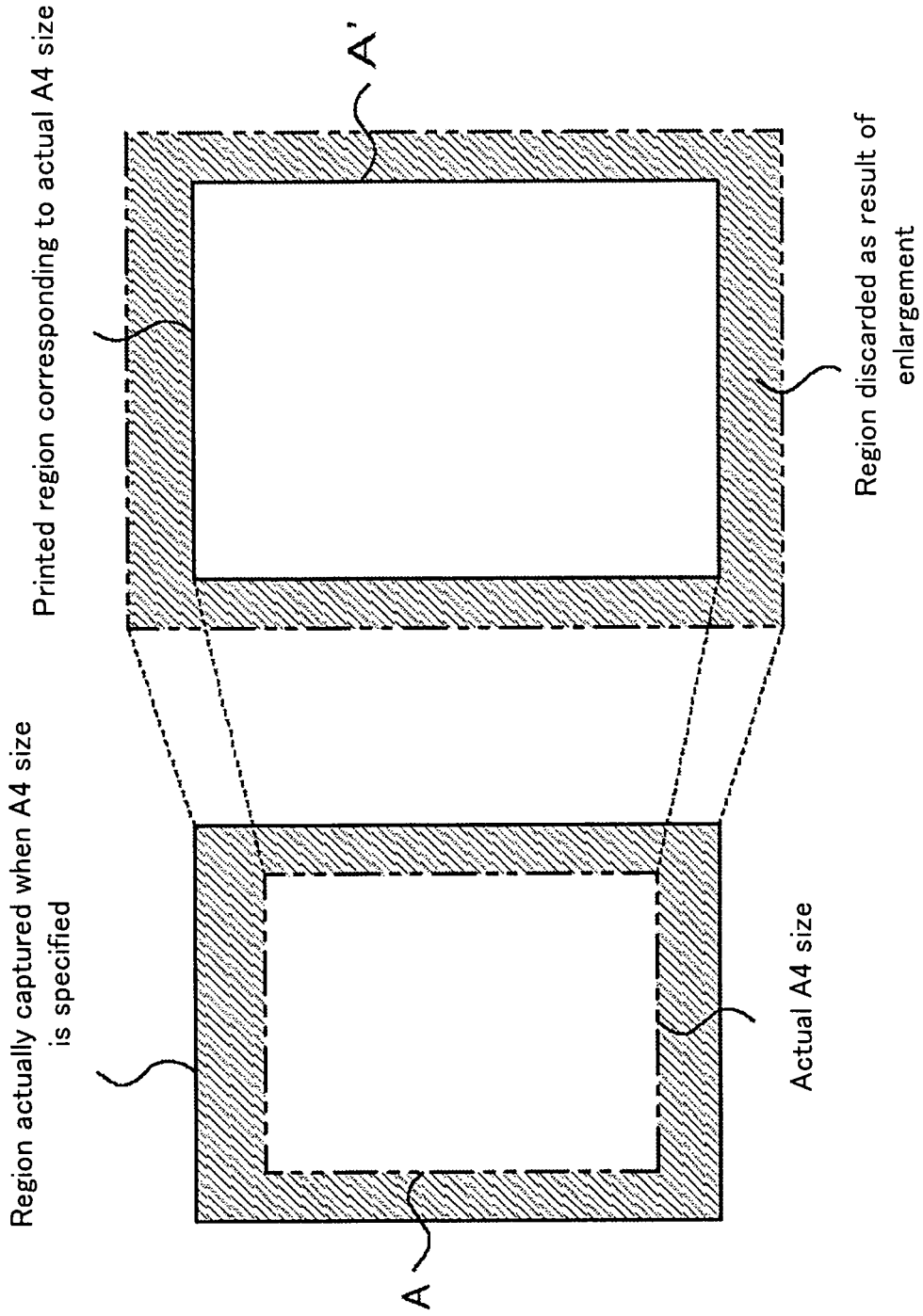
FIG. 4 is a drawing for explaining adjustment of print magnification associated with an embodiment of the present invention.

In more specific terms, as an example of the former, where as shown in FIG. 4—an original is captured at hybrid printer 1 with A4 size being specified as original size, the image (scan image) that is actually captured might be a scan region which includes the region outside the periphery of that original. In this case, because that outside region is a superfluous region which is not supposed to appear in the print results, print magnification is adjusted so as to yield enlargement such as will cause perimeter boundary portion A of the actual original to correspond to perimeter boundary portion A' of the printing paper when four-sided borderless printing is carried out. This being the case, superfluous region(s) is/are not printed and it is possible to obtain print results capable of satisfying users when four-sided borderless printing is carried out.

Figure 5:
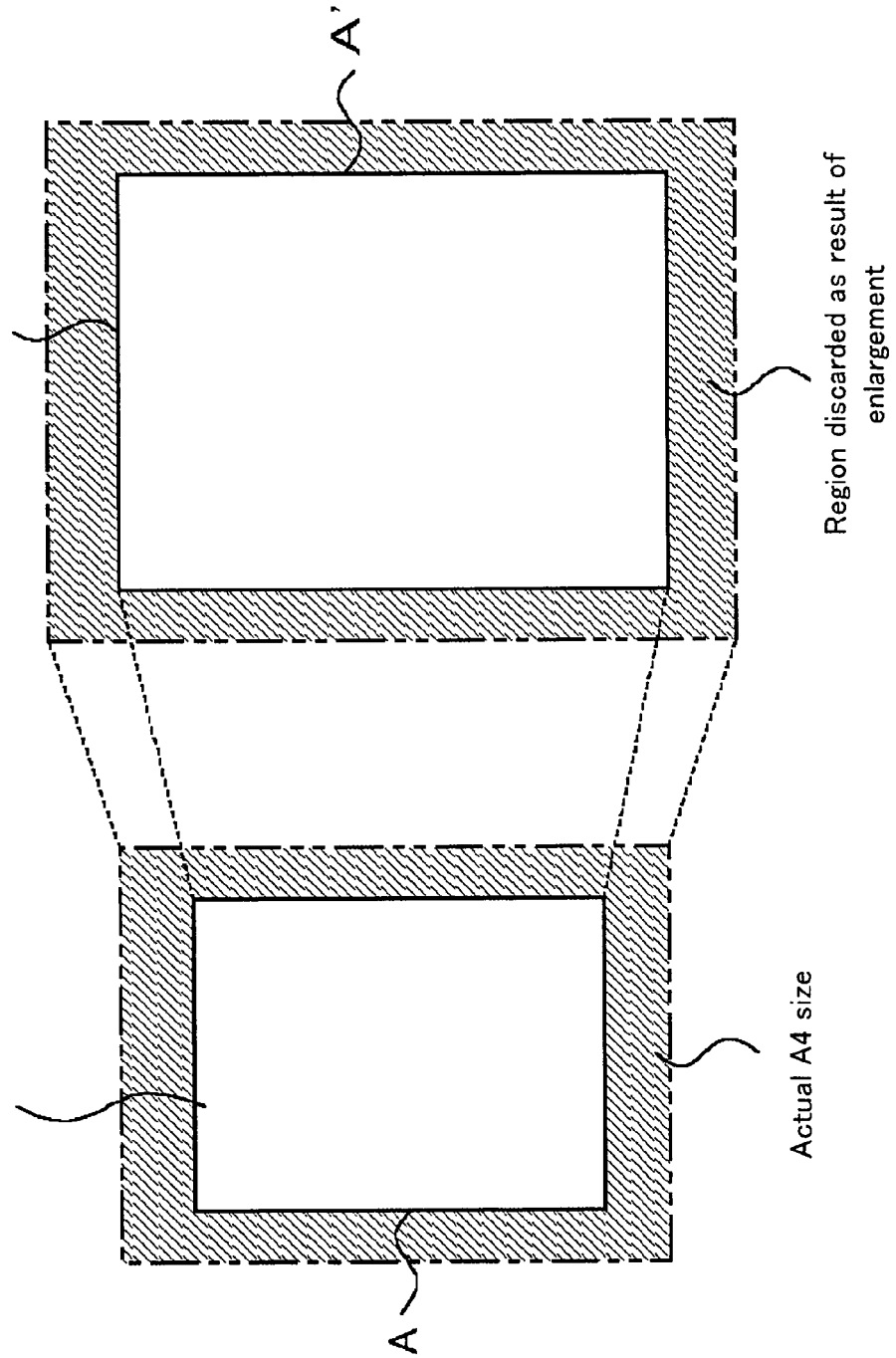
FIG. 5 is a drawing for explaining adjustment of print magnification associated with an embodiment of the present invention.

Furthermore, as an example of the latter, where—as shown in FIG. 5—an original is captured at hybrid printer 1 with A4 size being specified as original size, the image that is actually captured might be a scan region in which the region inside the original-size perimeter is a margin-like region. In such case, because printing this without further modification would cause the margin-like region to appear in the print results, print magnification is adjusted so as to yield enlargement such as will cause inside boundary portion A of the region inside the perimeter of the original to correspond to outside edge boundary portion A' of the printing paper when four-sided borderless printing is carried out. This being the case, margin-like region(s) produced where capture was not possible at the time of capture is/are not printed and it is possible to obtain print results capable of satisfying users when four-sided borderless printing is carried out.

Figure 6:
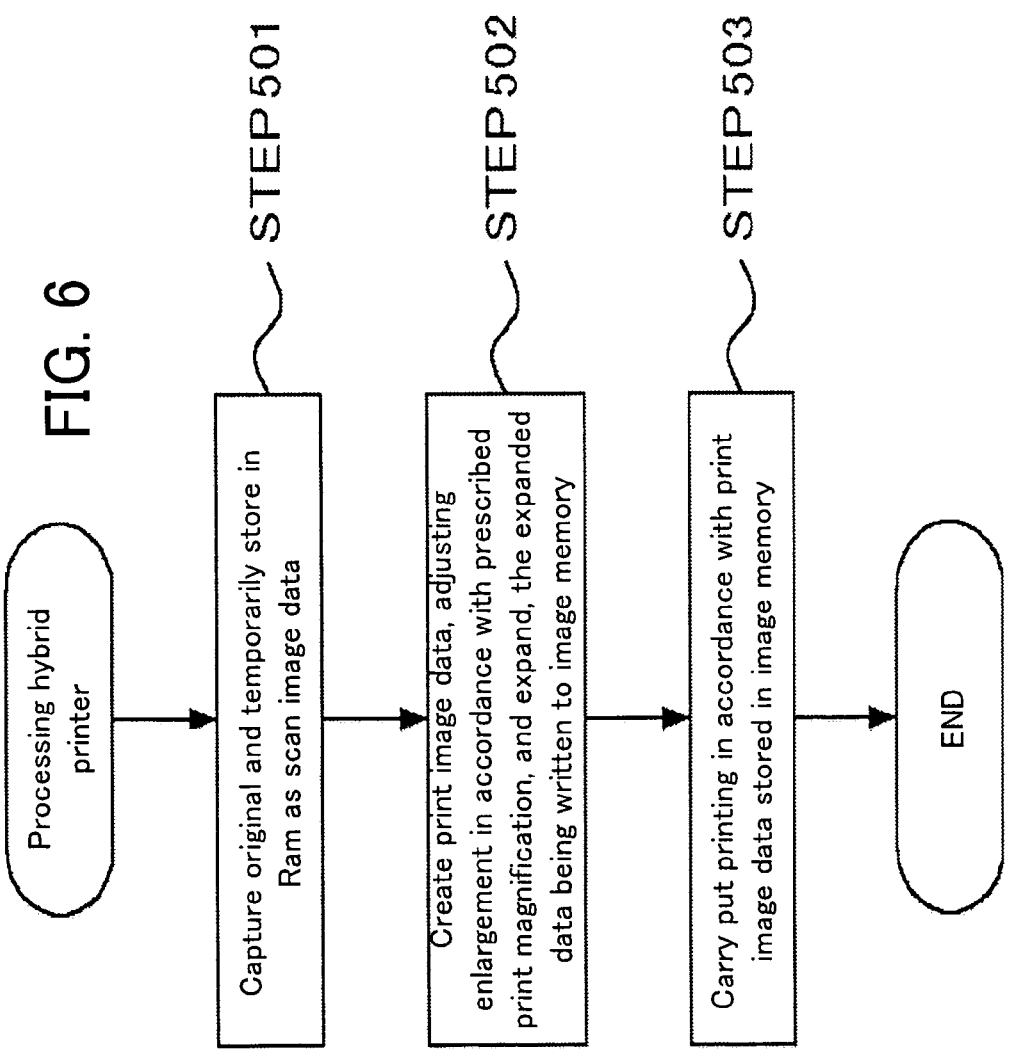
FIG. 6 is a flowchart for explaining operation of a hybrid printer associated with an embodiment of the present invention.

FIG. 6 is a flowchart for explaining operation of hybrid printer 1 associated with the present embodiment. At same FIG., the series of processing steps occurring following capture of original(s) in the form of image(s) by means of scanner functionality up to the point in time when printing thereof is carried out by means of printing functionality is shown in a single flowchart.

To wit, when a user places an original on original stage 12, closes cover 13, and operates user interface 11 so as to give image scan instruction(s) and/or printing instruction(s), hybrid printer 1, under the control of scanner circuitry 209, controls the scanner mechanism and carries out operations for scanning of the original, the scanned image being temporarily stored at RAM 23 in the form of scan image data (step 501). Following completion of scanning by the scanner mechanism, hybrid printer 1 converts the scan image data into print image data which is expanded, the expanded data being written to image memory 26. At this time, hybrid printer 1 carries out conversion into image data consistent with a print magnification (e.g., 105%) which has been previously set so as to cause the print image to be enlarged relative to the initial image (original image) (step 502). Moreover, following conclusion of conversion into image data, hybrid printer 1 supplies the image data which has been stored in image memory 26 to print engine 28, and carries out printing on printing paper (step 503). Note also that supply of print image data to print engine 28 may be initiated at the stage where print image data of a prescribed width of band(s) have been stored at image memory 26.

As described above, in accordance with the present embodiment, because print image data is created based on captured scan image data with print magnification being adjusted in such manner as to cause printed image(s) to be enlarged relative to original image(s) by amount(s) such as would not appear visually strange to user(s) and printing is carried out in accordance with such created print image data, even where scan region(s) during capture of image(s) contain superfluous region(s) and/or contain margin-like region(s) in the event that it is not possible to capture the entire original, such superfluous region(s) and/or margin-like region(s) will not appear in print results and it is possible to obtain results capable of satisfying users when four-sided borderless printing is carried out. In particular, the present embodiment makes it possible to address user demand with respect to ability to achieve satisfactory four-sided borderless printing while keeping product cost to a minimum and without the need to improve the mechanical precision of the scanner mechanism and/or the print mechanism.

Next, another embodiment of a hybrid printer in accordance with the present invention will be described.

Such a hybrid printer might, for example, have a constitution such as is shown in FIGS. 1 and 2, and might, moreover, be provided not only with hybrid printer functionality but also with functionality permitting it to also serve as standalone image scanner and functionality permitting it to also serve as standalone inkjet printer. Such a hybrid printer might have user-selectable scanner mode(s), printer mode(s), and hybrid printer mode(s), such modes being capable of being entered in alternative fashion in response to user request; i.e., such hybrid printer might be capable of being used in multimode fashion (such a hybrid printer will hereinafter be referred to as a "multimode hybrid printer").

In the event that scanner mode has been specified, the multimode hybrid printer might carry out processing whereby image(s) of original(s) placed at prescribed location(s) on original stage(s) is/are optically scanned, scan image data is created, and such scan image data is sent to personal computer(s) and/or other such host apparatus(es), not shown. In the event that printer mode has been specified, the multimode hybrid printer might carry out processing whereby print image data is received from host apparatus (es), not shown, and image(s) represented by such print image data is/are printed on user-specified printing paper. In the event that hybrid printer mode has been specified, the multimode hybrid printer might carry out processing whereby print image data is created based on scan image data created as a result of scanning of original(s) placed on original stage(s), and print image(s) represented by such print image data is/are printed on user-specified printing paper.

Provided at control panel(s), not shown, provided at the multimode hybrid printer there are a plurality of buttons for entering desired setting(s) at and/or giving desired command(s) to the multimode hybrid printer, and display screen(s) at which current mode setting(s) of the multimode hybrid printer, status(es) of the multimode hybrid printer, and/or the like may be displayed. User(s) can use such control panel(s) to switch among scanner mode(s), printer mode(s), and hybrid printer mode(s). Furthermore, within hybrid printer mode, user(s) can use such control panel(s) to selectively specify NORMAL COPY MODE(S), COMPLETELY BORDERLESS COPY MODE(S), and/or QUASI-BORDERLESS COPY MODE(S), described below, and/or to enter settings with respect to number (sets) of copies.

Below, referring to FIG. 7 and following FIGS., a multimode hybrid printer operating in NORMAL COPY MODE(S), COMPLETELY BORDERLESS COPY MODE(S), and/or QUASI-BORDERLESS COPY MODE(S) will be described in detail.

Figure 7:
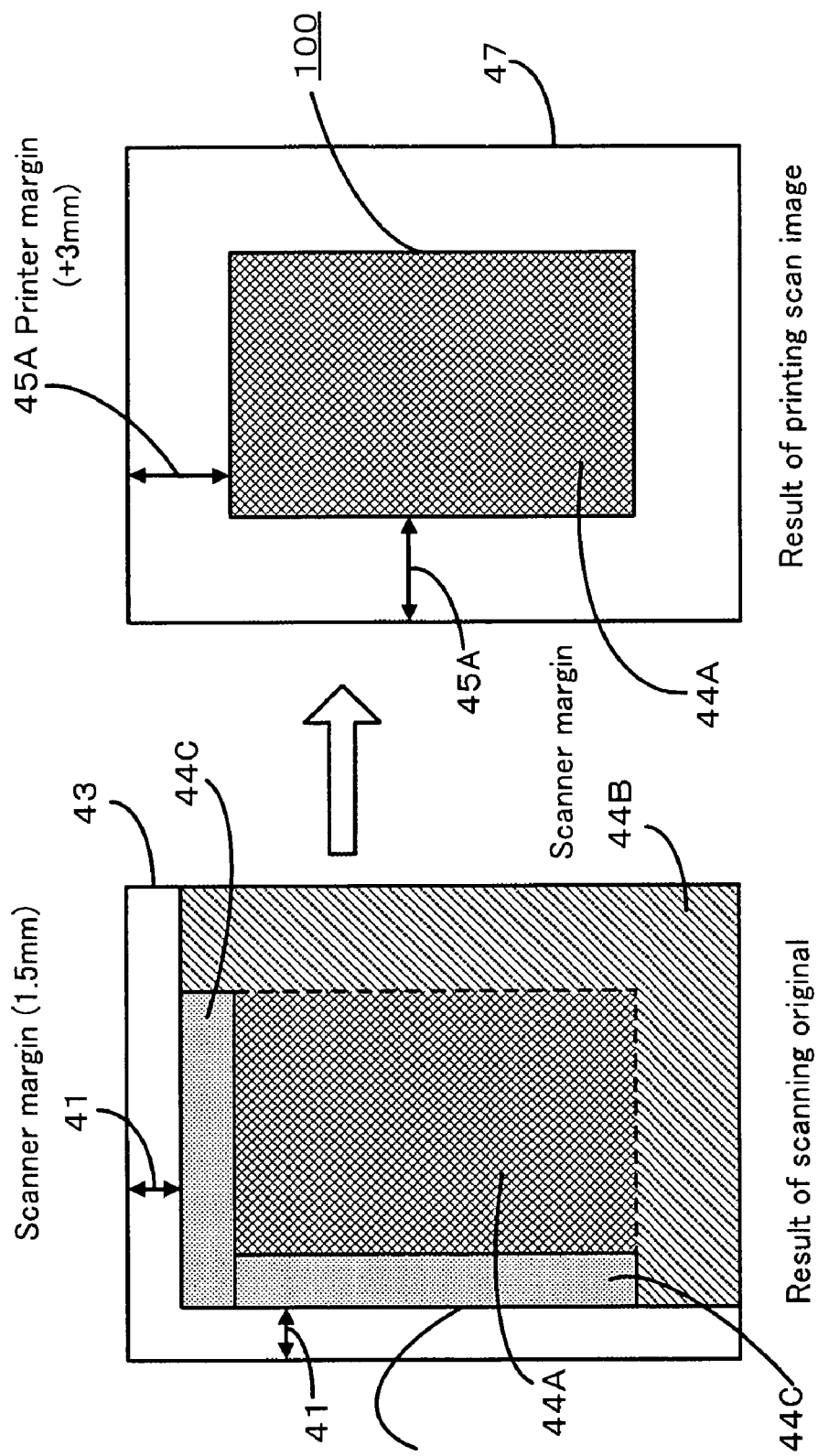
FIG. 7 is a drawing showing copying as might occur when carrying out operations in accordance with a NORMAL COPY MODE.

FIG. 7 is a drawing showing results of copying as might occur when in NORMAL COPY MODE. Note that, in order to simplify the description which follows, as shown in this drawing the size of original 43 and the size of printing paper 47 are assumed to be identical, and copy magnification is assumed to be "unity magnification" (and the same is also assumed to be true with respect to FIGS. 8 through 11, below).

NORMAL COPY MODE is a mode for causing the image of original 43 to be copied with margin-like space(s). Notwithstanding that other mode(s) calling for the image of original 43 to be copied without border(s) (i.e., COMPLETELY BORDERLESS COPY MODE and/or QUASI-BORDERLESS COPY MODE) may have been set, NORMAL COPY MODE is the mode that will automatically be entered in the event that the size of printing paper 47 is not among the aforementioned specific size(s) accommodating borderless printing.

In NORMAL COPY MODE, normal-copy printer margin(s) 45A (e.g., +3 mm) is/are set such as is/are sufficient to definitively prevent ink from being jetted beyond the edges of printing paper 47 due to variation in print start location (or, stated from a different perspective, such as is/are sufficient to definitively cause formation of margin-like spaces at the top, bottom, left, and right edges of printing paper 47 despite variation in print start location).

Furthermore, in NORMAL COPY MODE, scanner margin(s) 41 is/are set such as will permit the image of original 43 to be definitively scanned despite variation in original scan start location. Scanner margin(s) 41 is/are ordinarily set to value(s) (e.g., 1.5 mm) which is/are smaller than normal-copy printer margin(s) 45A (similar value(s) also being set for same in the other modes COMPLETELY BORDERLESS COPY MODE and QUASI-BORDERLESS COPY MODE). The reason for this is that it is possible to achieve a mechanical precision with image scanner 23 that is higher than that of printer 24, as a result of which it is possible to achieve a variation in original scan start location that is smaller than the variation in print start location.

Copying might take place as follows when in NORMAL COPY MODE.

To wit, at original 43 which has been placed on an original stage, an image scanner might scan the locus (i.e., scan region) 44 to the interior of previously set scanner margin 41. As a result, scanner circuitry creates scan image data representing scan image 80 present within scan region 44.

Processor(s) within the multimode copy apparatus correct the size of scan image 80 represented by scan image data, transforming it into a size such as will fit inside region (print region) 100 on printing paper 47 which is stepped inward from the edge(s) of printing paper 47 by the amount of normal-copy printer margin 45A, creating print image data representing scan image 44A which has been corrected in size, and cause scan image 44A to be printed on printing paper 47 based on that print image data.

More specifically, based on normal-copy printer margin 45A, processor(s) within the multimode copy apparatus crop portion(s) 44B, identical in width to normal-copy printer margin 45A, from portion(s) containing the right edge and bottom edge of scan image 80. Moreover, from portion(s) containing the top edge and left edge of the rectangular region which remains after cropping, processor(s) crop portion(s) 44C containing the margin(s) remaining after scanner margin 41 is subtracted from normal-copy printer margin 45A (portion(s) 44C may, instead of being portion(s) containing the top edge and left edge, be portion(s) containing the bottom edge and right edge). In addition, processor(s) control engine controller(s) such that printing is carried out on paper 47 so as to cause the portion 44A to be printed which remains after the aforementioned portion(s) 44B and portion(s) 44C have been cropped from scan image 80 (i.e., the scan image after correction in size) to be positioned in the center of printing paper 47 (i.e., so as to cause the center of the portion 44A to be printed to coincide with the center of printing paper 47). As a result, margin-like spaces equal to normal-copy printer margin 45A are formed in the vicinities of the top, bottom, left, and right edges of printing paper 47 on which the portion 44A to be printed has been printed. Note that the print start location for causing the portion 44A to be printed to be positioned in the center of paper 47 may, with the upper left corner of the portion 44A to be printed serving as reference point, have been determined in advance or may be determined based on calculation performed during printing of each page.

By means of a method such as the foregoing, it is possible to carry out copying at unity magnification with formation of margin-like spaces equal to printer margin 45A even where scanner margin 41 is smaller than printer margin 45A.

Figure 8:
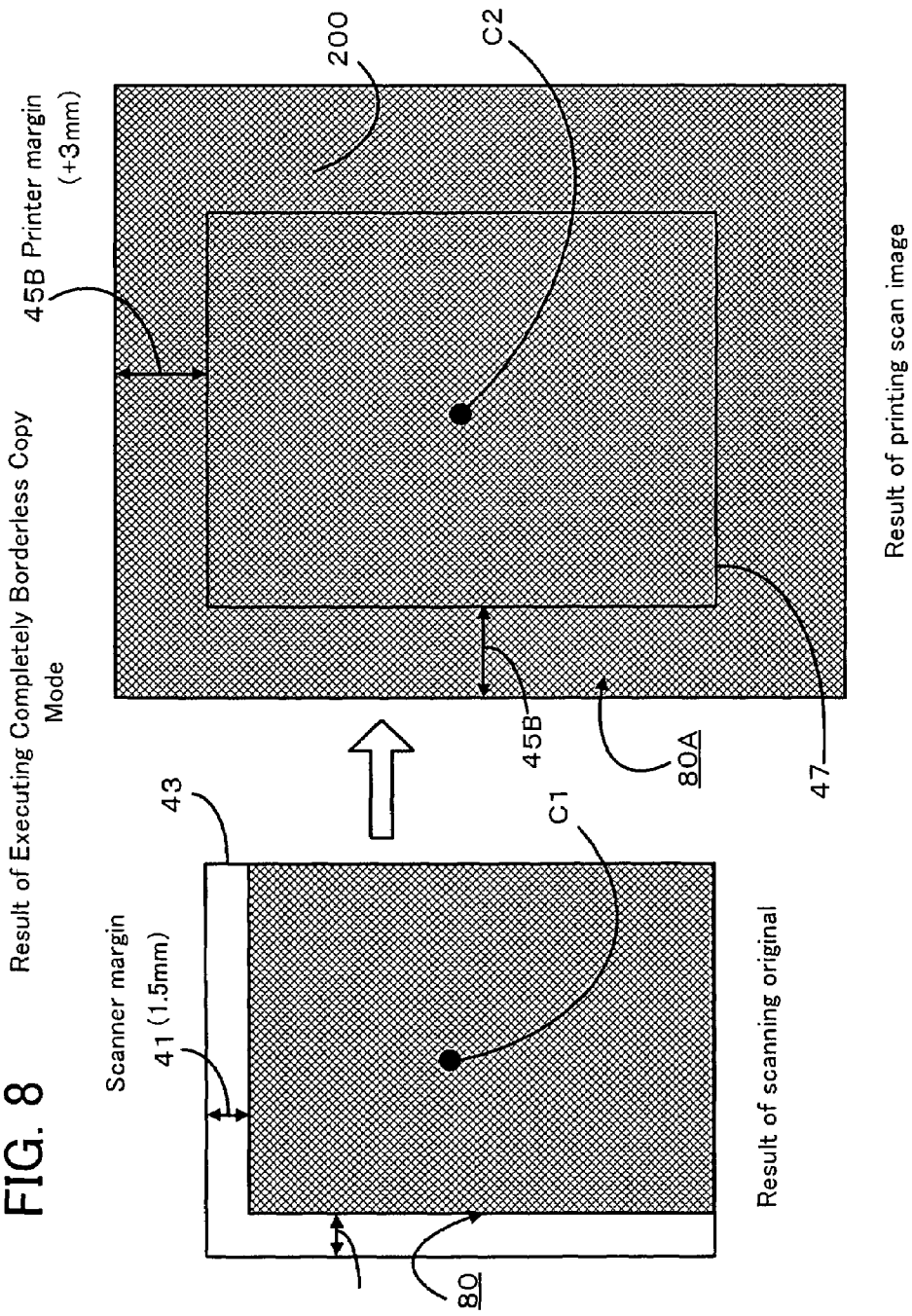
FIG. 8 is a drawing showing copying as might occur when carrying out operations in accordance with a COMPLETELY BORDERLESS COPY MODE.

FIG. 8 is a drawing showing results of copying as might occur when in COMPLETELY BORDERLESS COPY MODE.

COMPLETELY BORDERLESS COPY MODE is a mode for causing the image of original 43 to be copied completely without formation of margin-like space(s) (execution of this mode may not be possible unless, for example, the size of printing paper 47 is among the aforementioned specific size(s) accommodating borderless printing).

In COMPLETELY BORDERLESS COPY MODE, scan image 80 is printed on printing paper 47 such that it is enlarged so as to be a size which is larger than the size of printing paper 47. As scan image size(s) which will definitively ensure successful borderless printing, considering the variation in print start location attributable to the mechanical precision of the print mechanism of the multimode hybrid printer, where, for example, the scan image is disposed in the center of paper 47, size(s) might be employed such as is/are sufficient to cause such image to extend at least approximately 3 mm beyond the top, bottom, left, and right edges of the printing paper. Considering the width(s) of such overextending portion(s) 200 to be "printer margin(s)" under a broad definition of that term, completely-borderless-copy printer margin 45B is set in advance and copying is carried out based on this printer margin 45B when in COMPLETELY BORDERLESS COPY MODE. Completely-borderless-copy printer margin 45B, which is such as to cause the size of the printed image to be a size definitively extending beyond the edges of paper 47 and which is thus set with the intention of causing printing to be carried out such that margin-like space(s) are definitively not formed, is in a symmetric relationship with normal-copy printer margin 45A, which is such as to cause the entire printed image to definitively fit within the confines of paper 47 and which is thus set with the intention of preventing jetting of ink beyond the edges of paper 11 and soiling of platen 11. In the present embodiment, therefore, the size of normal-copy printer margin 45A will be represented by a positive value, and completely-borderless-copy printer margin 45B will be represented by a negative value (e.g., −3 mm).

Now, copying might take place as follows when in COMPLETELY BORDERLESS COPY MODE.

To wit, scanner circuitry acquires scan image 80 by scanning an image of the region (i.e., scan region) on original 43 which is stepped inward from the edge(s) of original 43 by the amount of previously set scanner margin 41.

Processor(s) within the multimode hybrid printer enlarge acquired scan image 80, creating image 80A, consistent with printer margin 45B. Note, however, that the magnification by which image 80A is enlarged at this time is, taking scan image 80 to be 100, definitively less than would be the case were conventional borderless-printing printer technology to be applied without modification to a conventional hybrid printer. The reason for this is that, in the present embodiment, scanner margin 41 is not set so as to be equal in size to the large printer margin 45A employed for normal copying but is set to a small size consistent with the high mechanical precision of the scanner mechanism. As a result, copying can be carried out at magnification(s) close to unity magnification even when borderless copying is being carried out.

Now, having enlarged scan image 80 and transformed it into image (hereinafter "enlarged scan image") 80A, processor(s) control engine controller(s) so as to cause enlarged scan image 80A to be printed on paper 47 such that center C1 of original 43 at enlarged scan image 80A coincides with center C2 of printing paper 47 representing copy results. As a result, an image of the scan region of original 43 is copied in borderless fashion at the center of printing paper 47 (but note that since scan image 80 is enlarged so as to be larger than the size of printing paper 47, this does not mean that the entire expanse of scan image 80 will fall on paper 47). Note that the print start location for carrying out such copying may have been determined in advance or may be determined based on calculation performed during printing of each page.

Figure 9:
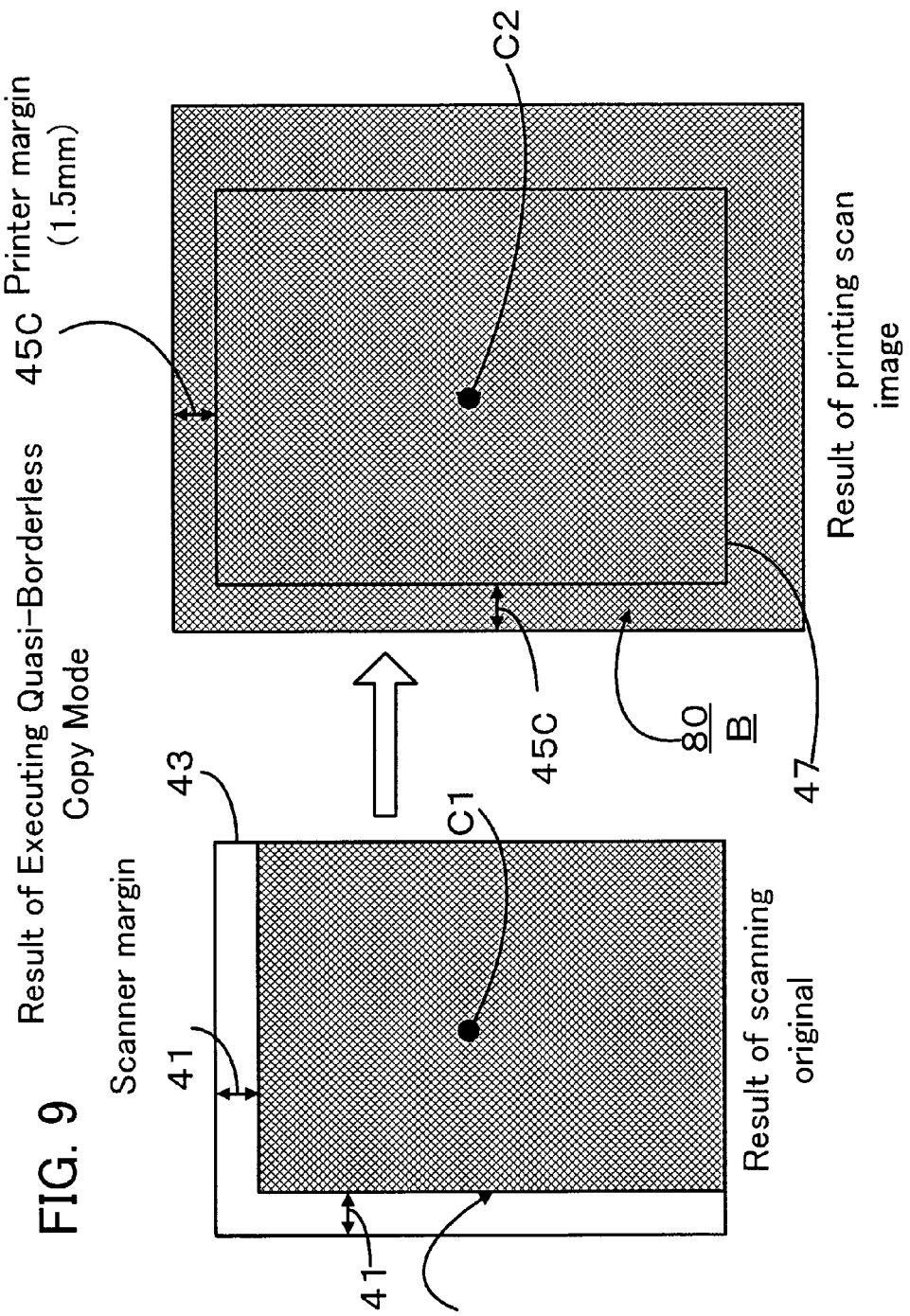
FIG. 9 is a drawing showing copying as might occur when carrying out operations in accordance with a QUASI-BORDERLESS COPY MODE.

FIG. 9 is a drawing showing results of copying as might occur when in QUASI-BORDERLESS COPY MODE.

QUASI-BORDERLESS COPY MODE is a mode for obtaining a borderless image of an original but at magnification(s) closer to desired copy magnification(s) (e.g., unity magnification) than would be the case with COMPLETELY BORDERLESS COPY MODE.

In QUASI-BORDERLESS COPY MODE, the printer margin(s) (hereinafter "quasi-borderless-copy printer margin(s)") 45C which is/are set is/are of size(s) (e.g., −1.5 mm) smaller than normal-copy printer margin(s) 45A (e.g., +3 mm) but larger than completely-borderless-copy printer margin(s) 45B (e.g., −3 mm). This being the case, in QUASI-BORDERLESS COPY MODE, enlarged scan image 80B is, when printed, larger than a size such as will fit inside the region on printing paper 47 which is stepped inward from the edge(s) of printing paper 47 by the amount of normal-copy printer margin 45A, but smaller than the size of scanned image 80A as printed when in COMPLETELY BORDERLESS COPY MODE. As a result, when copying is carried out in QUASI-BORDERLESS COPY MODE, it will be the case either that absolutely no margin-like space is formed or, if margin-like space(s) is/are formed, that margin-like space(s) narrower in width than would be the case with NORMAL COPY MODE is/are formed at at least one edge of printing paper 47. Because copying may be carried out completely without formation of margin-like space(s), it will not be possible to execute QUASI-BORDERLESS COPY MODE unless the size of printing paper 47 is among the aforementioned specific size(s) accommodating borderless printing, just as was the case with COMPLETELY BORDERLESS COPY MODE.

Copying may be carried out in QUASI-BORDERLESS COPY MODE in the same fashion as in COMPLETELY BORDERLESS COPY MODE.

To wit, scanner circuitry acquires scan image 80 by scanning an image of the region on original 43 which is stepped inward from the edge(s) of original 43 by the amount of previously set scanner margin 41.

Processor(s) within the multimode hybrid printer enlarge acquired scan image 80 and create image (hereinafter "enlarged scan image") 80B consistent with printer margin 45C. The magnification of enlarged scan image 80B at this time is, taking the initial scan image 80 to be 100, less than would be the case with COMPLETELY BORDERLESS COPY MODE, as was stated above. As a result, in the event that borderless printing is successful, the image produced as a result of copying will be an image which is closer to the desired magnification(s) (e.g., unity magnification) than would be the case for a borderless image produced in COMPLETELY BORDERLESS COPY MODE.

Now, having created enlarged scan image 80B, processor(s) control engine controller(s) so as to cause enlarged scan image 80B to be printed on paper 47 such that center C1 of original 43 at enlarged scan image 80B coincides with center C2 of printing paper 47 representing copy results. As a result, image 80 of the scan region of original 43 can be copied in borderless fashion at the center of printing paper 47. Note that the print start location for carrying out such copying may have been determined in advance or may be determined based on calculation performed during printing of each page.

Figure 10:
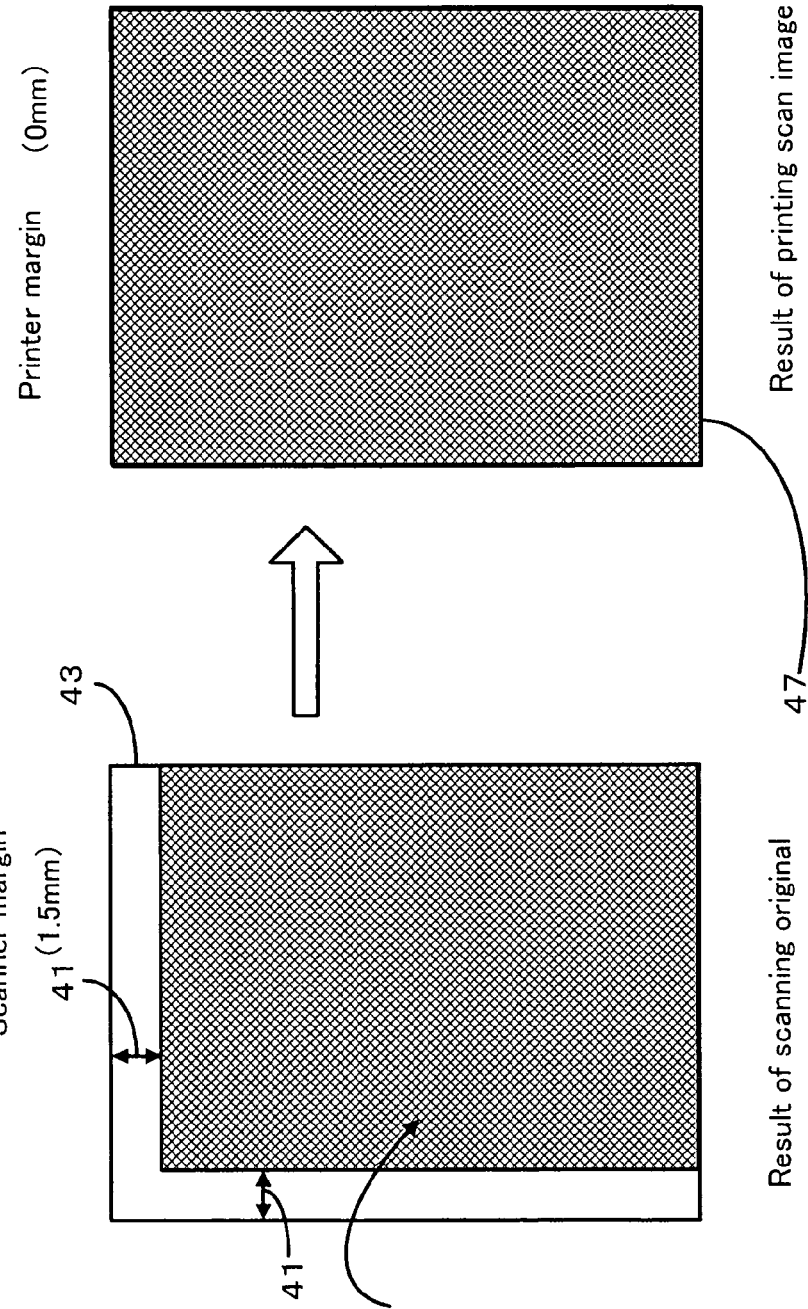
FIG. 10 is a drawing showing copying as might occur when employing the QUASI-BORDERLESS COPY MODE of FIG. 9 and when printer margin 45C is changed.
Figure 11:
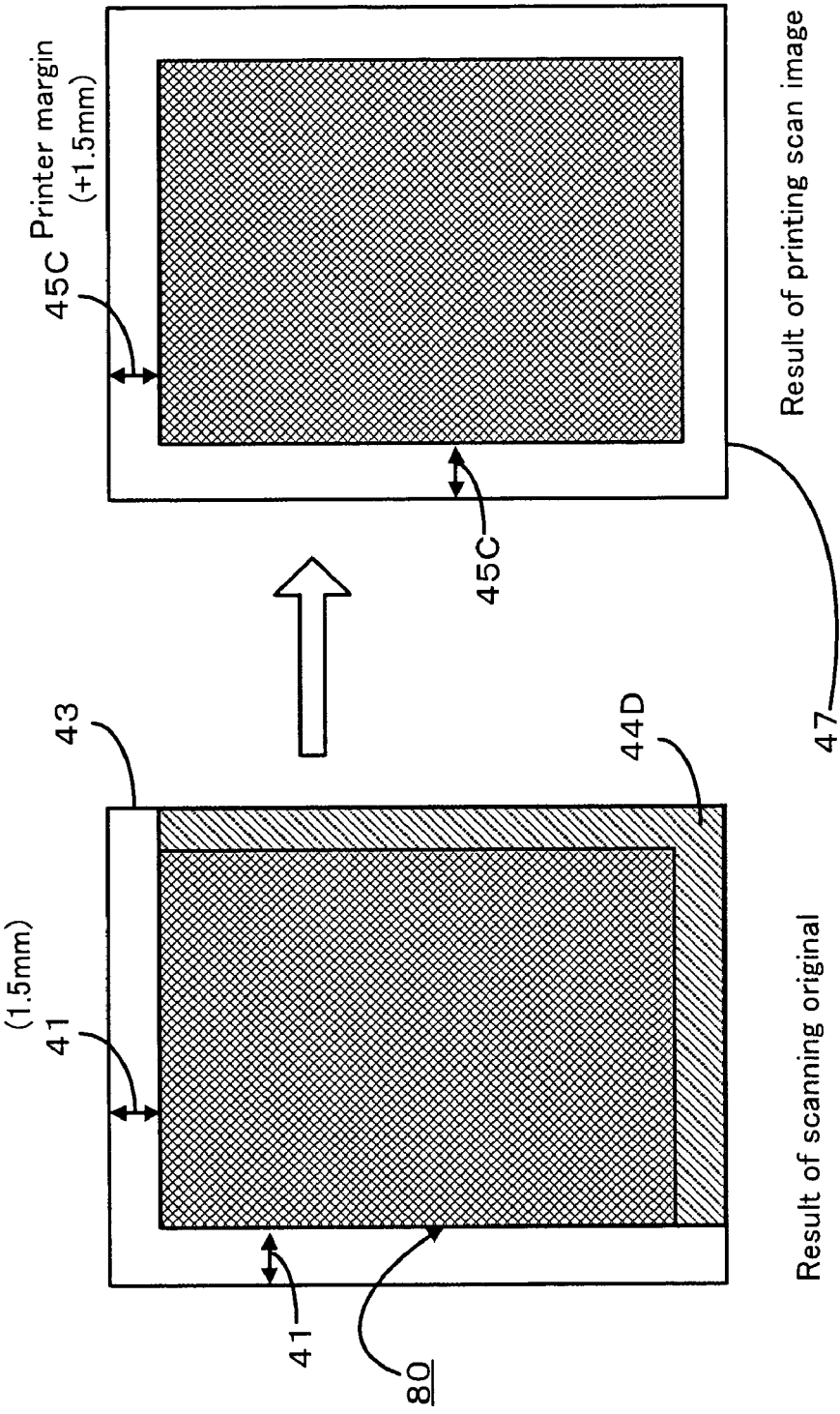
FIG. 11 is a drawing showing copying as might occur when employing the QUASI-BORDERLESS COPY MODE of FIGS. 9 and 10 and when printer margin 45C is changed.

Above, QUASI-BORDERLESS COPY MODE has been described. Note that, in this mode, printer margin(s) 45C may be any size whatsoever so long as the aforementioned condition is satisfied (i.e., printer margin(s) 45C must be within the range from normal-copy printer margin 45A to completely-borderless-copy printer margin 45B). For example, as shown in FIG. 10, employing a quasi-borderless-copy printer margin 45C of 0 mm will permit (but not definitively however) execution of completely borderless copying at copy magnification(s) closest to that or those desired by user(s) (e.g., unity magnification). Furthermore, as shown in FIG. 11, employing a quasi-borderless-copy printer margin 45C of 1.5 mm—the same as scanner margin 41—will permit execution of substantially completely borderless copying (some small margin-like space(s) being formed) but at copy magnification(s) exactly matching that or those requested by user(s) (in which case, scan image 80 may be printed without modification or may be printed after first cropping away therefrom prescribed portion(s) 44D consistent with quasi-borderless-copy-mode printer margin 45C).

Furthermore, in QUASI-BORDERLESS COPY MODE, quasi-borderless-copy printer margin 45C may be automatically adjusted within the aforementioned range in accordance with prescribed algorithm(s) (e.g., based on the state of the multimode hybrid printer). More specifically, automatic adjustment of magnification(s) of scan image 80 within a specific range (e.g., within a range from 100% to 105% where the copy magnification desired by the user is 100% (unity magnification)) might cause quasi-borderless-copy-mode printer margin 45C to be automatically adjusted within the aforementioned range. Referring to the example shown in FIG. 12, in the event that the magnification of scan image 80 is adjusted, the print start location of scan image 80A as enlarged based on adjusted magnification may itself be adjusted based on calculation and/or preprepared table(s) (table(s) recording respective print start location(s) corresponding to respective magnification(s)).

Figure 13:
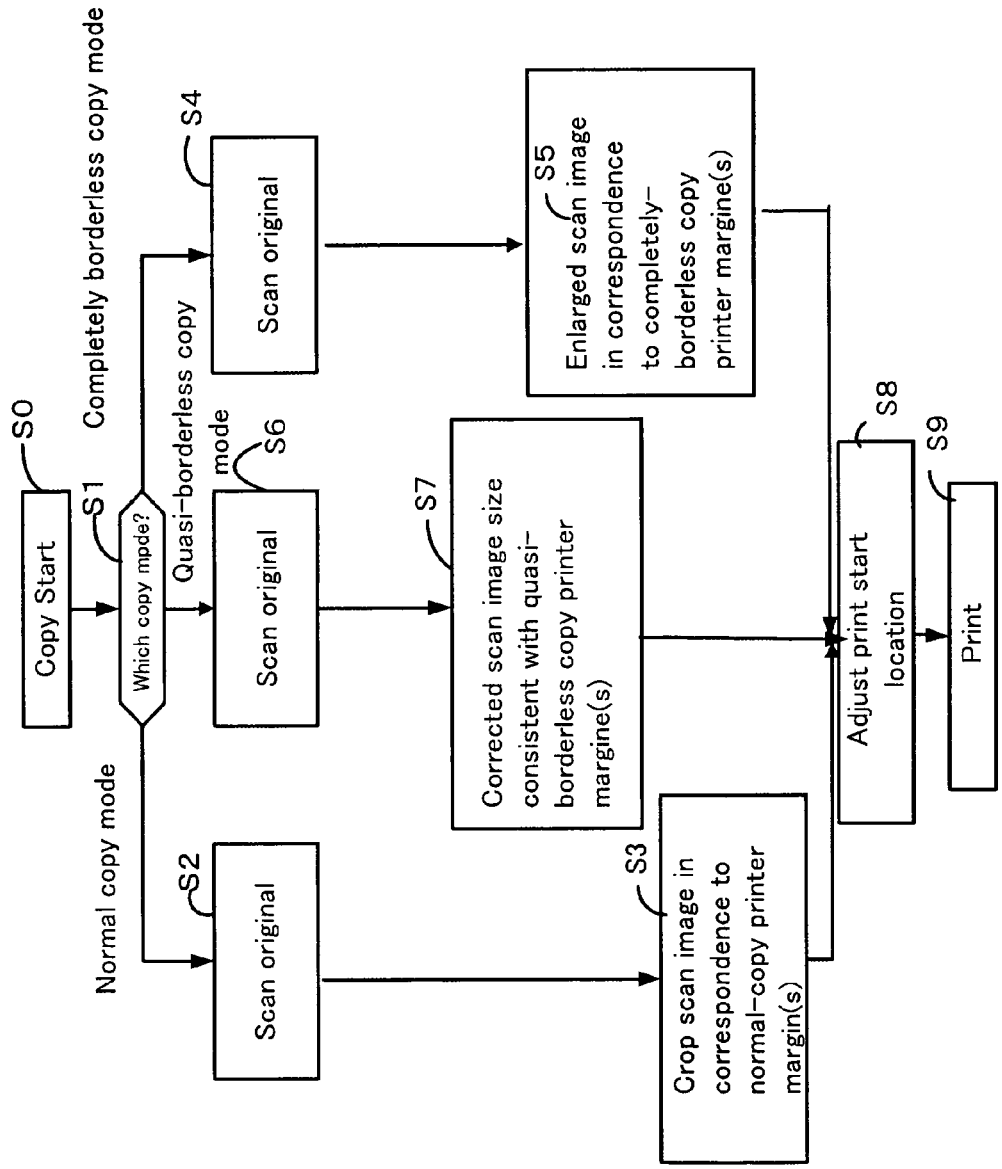
FIG. 13 is a flowchart showing flow of processing in connection with copying such as might be carried out in the context of a multimode hybrid printer.

Below, referring to FIG. 13, flow of processing in connection with copying such as might be carried out in the context of the aforementioned multimode hybrid printer is described. Note that, in the description which follows, original and printing paper sizes are for convenience of description assumed to be identical, and printing paper size(s) are assumed to be size(s) accommodating completely borderless copying. Furthermore, the copy magnification specified by the user is assumed to be unity magnification.

When a copy start button (not shown) on a control panel is pressed, the multimode hybrid printer begins copying (step S0).

At such time, in the event that the mode specified by the user is NORMAL COPY MODE (NORMAL COPY MODE at S1), flow of processing might be as follows (note that the following description is made with reference to FIG. 13).

That is, an image of the original placed on the original stage is first scanned (S2) consistent with scanner margin 41 (e.g., 1.5 mm), and scan image 80 is acquired. In addition, this scan image 80 is cropped consistent with normal-copy printer margin 45A (e.g., 3 mm), perimeter portion(s) 44B and portion(s) 44C thereof being removed therefrom in the manner as has already been described (S3). Print start location(s) of portion(s) 44A which remain after cropping is/are adjusted based on calculation and/or preprepared table(s) as described above (S8), and portion(s) 44A is/are thereafter printed at the approximate center of printing paper 47 (S9).

Figure 12:
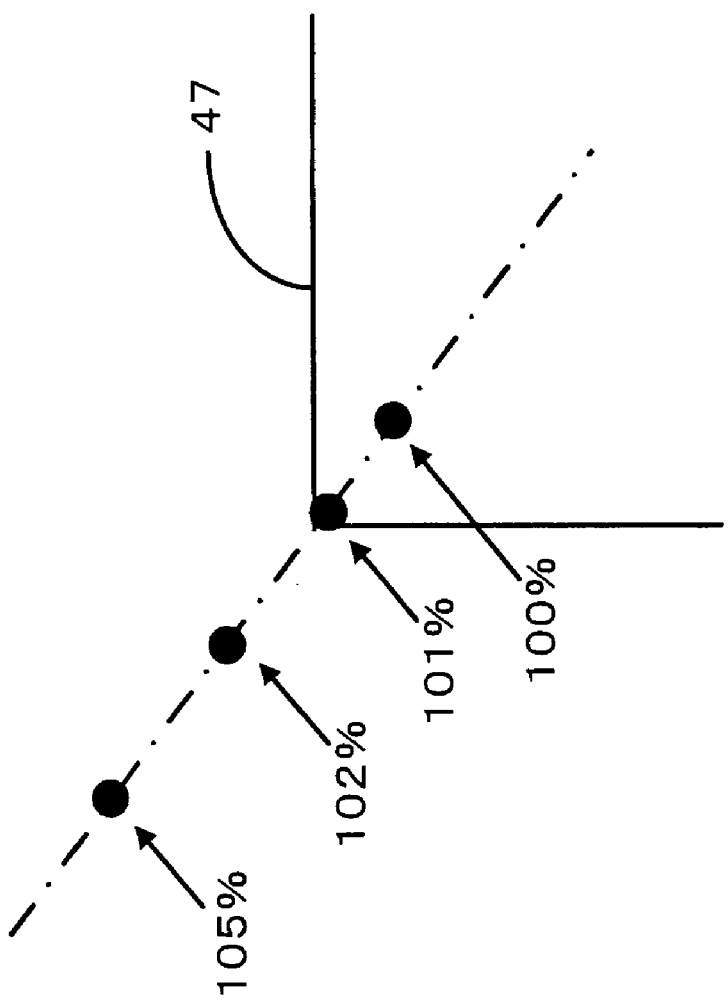
FIG. 12 is a drawing showing, in the context of a QUASI-BORDERLESS COPY MODE, a plurality of print start locations respectively corresponding to a plurality of copy magnifications settable based on printer margin 45C.

Furthermore, at the start of copying (step S0), in the event that the mode specified by the user is COMPLETELY BORDERLESS COPY MODE (COMPLETELY BORDERLESS COPY MODE at S1), flow of processing might be as follows (note that the following description is made with reference to FIG. 12 and with reference to FIG. 7).

That is, an image of the original placed on the original stage is first scanned (S4), and scan image 80 is acquired. In addition, this scan image 80 is enlarged consistent with completely-borderless-copy printer margin 45B (e.g., −3 mm) (S5). Print start location(s) of enlarged scan image(s) 80A is/are adjusted based on calculation and/or preprepared table(s) as described above (S8), and enlarged scan image(s) 80A is/are thereafter printed on printing paper 47 (S9).

Furthermore, at the start of copying (step S0), in the event that the mode specified by the user is QUASI-BORDERLESS COPY MODE (QUASI-BORDERLESS COPY MODE at S1), flow of processing might be as follows (note that the following description is made with reference to FIG. 13 and with reference to FIGS. 9 through 11).

That is, an image of the original placed on the original stage is first scanned (S11), and scan image 80 is acquired. In addition, the size of this scan image 80 is corrected (i.e., is enlarged somewhat (e.g., enlarged at some magnification between 101% and 105%) or specific portion(s) is/are cropped away therefrom) consistent with quasi-borderless-copy printer margin 45C (quasi-borderless-copy printer margin 45C being, e.g., some value within the range from +3 mm to −3 mm) which may have been set in advance or which may be calculated at this time, i.e., at the time of copying, using a prescribed algorithm (S7) (but note that correction is unnecessary in the special case where the size of quasi-borderless-copy printer margin 45C is the same as the size of scanner margin 41). Print start location(s) of the size-corrected image(s) is/are adjusted based on calculation and/or preprepared table(s) as described above (S8), and the size-corrected image(s) is/are thereafter printed on printing paper 47 (S9). The foregoing is a sequence of operations in connection with copying such as might be carried out in the context of a multimode hybrid printer associated with the present embodiment.

Moreover, in this sequence of operations, if the sizes of original 43 and paper 47 are different, the multimode hybrid printer might automatically adjust copy magnification (i.e., might automatically adjust the size of the image of the scanned original) based on the difference in sizes of original 43 and paper 47 (the respective sizes of original 43 and paper 47 may be identified by means of prescribed sensor(s) and/or may be identified as a result of communication by the user).

Figure 14:
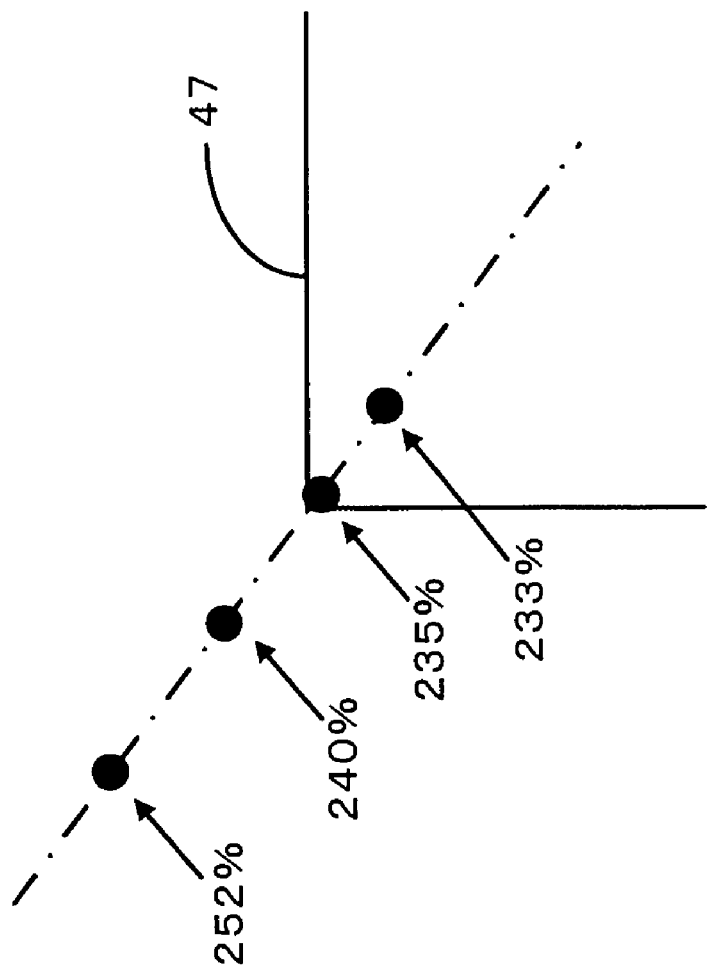
FIG. 14 is a drawing showing, during adjustment of copy magnification by page fitting functionality in the context of a QUASI-BORDERLESS COPY MODE, a plurality of print start locations respectively corresponding to a plurality of copy magnifications settable based on printer margin 45C.

If, for example, original 43 is photograph size L and paper 47 is size A4, copy magnification might be set to 233% in order to permit proper normal copying of the image of original 43 onto the entirety of paper 47 (such functionality will hereinafter be referred to as "page fitting functionality"). In such a case, in order to adjust quasi-borderless-copy printer margin 45C within the aforementioned range (i.e., within the range from normal-copy printer margin 45A to completely-borderless-copy printer margin 45B), the multimode hybrid printer might in QUASI-BORDERLESS COPY MODE further adjust within a specific range (e.g., within a range from 233% to 252%) the copy magnification of "233%" which was obtained as a result of the foregoing adjustment. As shown in FIG. 14, the print start location of the scan image which has been corrected in size based on adjusted magnification may be adjusted based on calculation and/or preprepared table(s) (table(s) recording respective print start location(s) corresponding to respective magnification(s)).

Furthermore, in the foregoing sequence of operations, where COMPLETELY BORDERLESS COPY MODE and/or QUASI-BORDERLESS COPY MODE has been specified despite the fact that size(s) of printing paper 47 specified by user(s) is/are not size(s) accommodating borderless printing, message(s) to the effect that specified copy mode(s) cannot be executed might be displayed at display screen(s) at control panel(s).

Furthermore, in the foregoing sequence of operations, where copy magnification(s) greater than unity magnification (i.e., for enlarged copy or copies) and/or copy magnification(s) less than unity magnification (i.e., for reduced copy or copies) have been specified by user(s), size(s) of scan image(s) 80 may be enlarged and/or reduced based on such copy magnification(s). In the event that enlarged and/or reduced image(s) of scanned original(s) do not fit within print region(s) as defined by printer margin(s) 45A, 45B, and/or 45C in any of the several foregoing copy modes, it or they may be corrected in size (i.e., it or they may be reduced and/or portion(s) extending beyond print region(s) may be cropped off therefrom) so as to cause it or they to fit within the print region(s). On the other hand, in the event that enlarged and/or reduced scan image(s) do fit within print region(s) as defined by printer margin(s) 45A, 45B, and/or 45C, it or they may be printed at the approximate center of printing paper 47 either without further modification—there being no particular occasion for size correction—or after first being enlarged to size(s) matching such print region(s).

Furthermore, in the foregoing sequence of operations, the multimode hybrid printer might accept selection with respect to which is to be given priority: specified copy magnification(s) (and/or copy magnification(s) calculated by means of page fitting functionality) or specified copy mode(s). In such case, in the event that it is selected that priority should be given to copy magnification(s), the multimode hybrid printer would print scan image(s) 80 as corrected in size in accordance with specified copy magnification(s) without further modification even where, as a result of correction of size(s) of such image(s) in accordance with such copy magnification(s), printing of size-corrected image(s) without further modification would make it impossible to successfully execute user-specified copy mode(s) (e.g., where printing would result in formation of margin-like space(s) despite the fact that COMPLETELY BORDERLESS COPY MODE was specified). On the other hand, in the event that it is specified that priority should be given to copy mode(s), if printing of image(s) as corrected in size in accordance with user-specified copy magnification(s) without further modification would make it impossible to successfully execute user-specified copy mode(s) (e.g., when printing would result in formation of margin-like space(s) despite the fact that COMPLETELY BORDERLESS COPY MODE has been specified), the multimode hybrid printer would further correct size(s) of size-corrected image(s) so as to make it possible to successfully execute user-specified copy mode(s) before printing same.

As described above, in accordance with the foregoing second embodiment, it is possible for scanner margin 41 to be set to a small size consistent with the high mechanical precision of the scanner mechanism rather than being set so as to be equal in size to the large printer margin 45A employed for normal copying. This makes it possible to carry out borderless copying at magnification(s) closer to that or those desired by user(s) (e.g., unity magnification) than would be the case were conventional borderless-printing printer technology to be applied without modification to a conventional hybrid printer.

Furthermore, in accordance with the foregoing second embodiment, a mode, i.e., QUASI-BORDERLESS COPY MODE, for carrying out copying in a fashion that is intermediate between normal copying and completely borderless copying is available. In quasi-borderless copy mode, the size of scan image 80 is corrected so as to be larger than would be the case for normal copying but smaller than would be the case for completely borderless copying. This being the case, it is possible to carry out completely borderless copying at magnification(s) closer to magnification(s) desired by user(s) (e.g., unity magnification).

Moreover, variations such as the following could also be contemplated in connection with this second embodiment.

Figure 15:
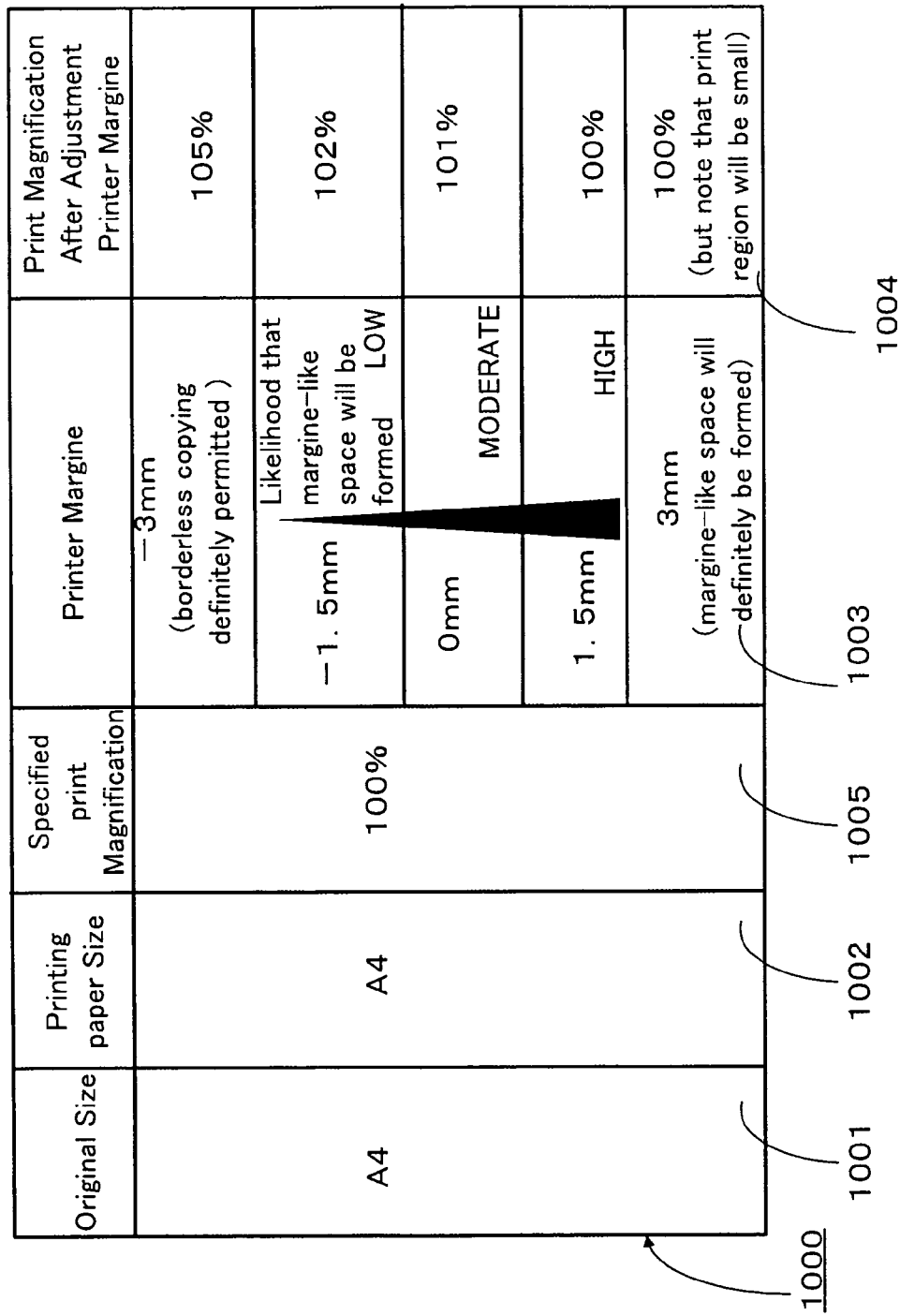
FIG. 15 is a drawing showing an example of a printer margin adjustment screen.

To wit, printer margin adjustment screen 1000 such as that shown by way of example in FIG. 15 might be displayed at a control panel of the multimode hybrid printer (or if a host apparatus is connected to the multimode hybrid printer, at a display screen of the host apparatus). Printer margin adjustment screen 1000 may be employed to freely adjust printer margin(s) so as to be within prescribed range(s). Below, printer margin adjustment screen 1000 is described in detail (note, moreover, that scanner margin in the present embodiment is assumed to be "1.5 mm").

Printer margin adjustment screen 1000 is provided with original size display area(s) 1001, specified print magnification display area(s) 1005, printing paper size display area(s) 1002, printer margin adjustment area(s) 1003, and print-magnification-after-adjustment-of-printer-margin display area(s) 1004.

Displayed at original size display area 1001 is/are size(s) of original(s) placed on original stage(s) 60. Moreover, original size(s) displayed at this original size display area 1001 may be automatically identified by the multimode hybrid printer and/or may be manually input by user(s).

Displayed at printing paper size display area 1002 is/are size(s) of paper on which printing is to be carried out as contained in current settings.

Displayed at specified print magnification display area 1005 is/are print magnification(s) (e.g., 100%) as manually specified by user(s). Moreover, in the event that, for example, original size(s) displayed at original size display area 1001 and printing paper size(s) displayed at printing paper size display area 1002 are different, print magnification(s) displayed at this area 1005 may be print magnification(s) as automatically adjusted by page fitting functionality.

Displayed at printer margin adjustment area 1003 in touch panel fashion or in other such fashion as to permit selection thereamong are a plurality of (e.g., five) printer margins. Furthermore, also displayed at printer margin adjustment area 1003 for each of the plurality of selectable printer margins is a description of what printing would be like if printing were to actually be carried out with that printer margin (this need only be some emblematic representation on the like sufficient to convey a sense of what printing would be like for each).

Displayed at print-magnification-after-adjustment-of-printer-margin display area 1004 are a plurality of (e.g., five) print magnifications as would result after adjustment of printer margin, these respectively corresponding to the aforementioned plurality of printer margins. "Print magnification after adjustment of printer margin" shows how printer margin settings affect print magnification for a given specified print magnification. Taking the situation depicted in the drawing, in the event, for example, that 100% printing (i.e., printing at unity magnification) is specified, selecting a printer margin of "1.5 mm"—this being identical in size to the scanner margin of "1.5 mm"—might result in display to the effect that 100% printing will definitely be possible. But despite the fact, for example, that 100% printing has been specified, setting printer margin to "−3 mm"—this being considerably different from the scanner margin of "1.5 mm"—might result in display to the effect that print magnification will increase to 105%. When specified print magnification (i.e., print magnification displayed at specified print magnification display area 1005) is changed, the respective print magnifications as would result after adjustment of printer margin which are displayed at print-magnification-after-adjustment-of-printer-margin display area 1004 are automatically changed in correspondence thereto.

In accordance with the present embodiment, the user can, at this printer margin adjustment screen 1000, select desired printer margin(s) from among a plurality of printer margins, with copying being carried out consistent with the selected printer margin(s). This makes it possible to accurately obtain copy results as desired.

Note also that the manner of printer margin adjustment need not be limited to that shown in FIG. 15. For example, adjustment may be accomplished by means of increase and/or decrease in prescribed increments.

A great many variations are possible with respect to the foregoing embodiments. For example, the printer mechanism employed in the hybrid printer is not limited to that of an inkjet printer, it being possible to employ that of other types of printer; e.g., that of a laser printer. Furthermore, paper size(s) for which it is possible to carry out borderless printing is/are not limited to the three presented above. Either a greater number or a lesser number of such size(s) is possible (for example, print mechanism(s) 27 and the like may be constituted in such fashion as to permit photograph size L and/or photograph size 2L to be paper size(s) for which it is possible to carry out borderless printing).

Figure 16:
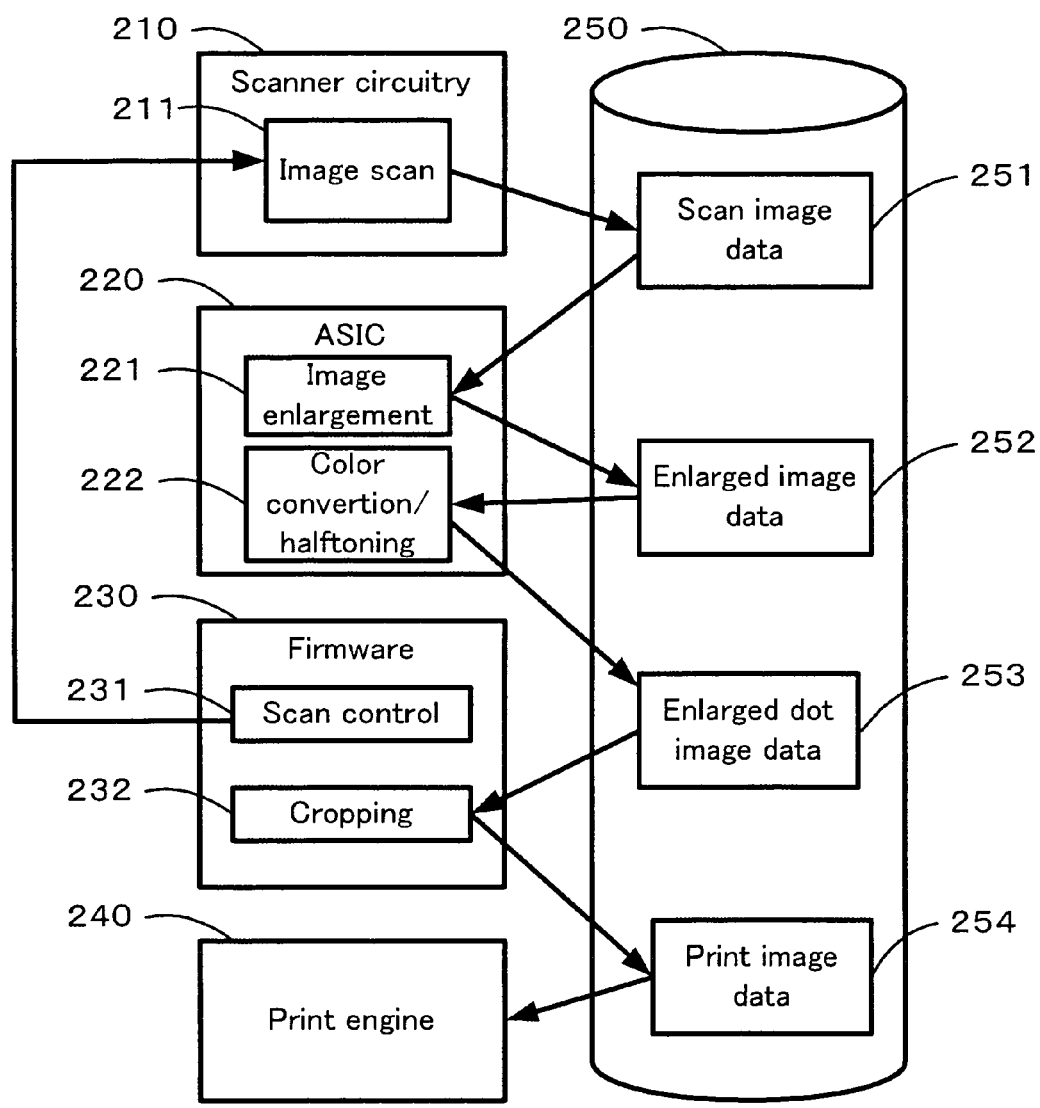
FIG. 16 is a block diagram showing constitution and function of the principal parts of another embodiment of a hybrid printer in accordance with the present invention.

FIG. 16 shows constitution and function of the principal parts of yet another embodiment of a hybrid printer in accordance with the present invention.

This hybrid printer has mechanical construction as is shown in FIG. 1; furthermore, as shown in FIG. 16, there are at the interior thereof scanner circuitry 210, ASIC(s) (Application Specified IC(s)) 220, firmware (i.e., microprocessor(s) executing firmware) 230, print engine(s) 240, and storage device(s) 250.

Scanner circuitry 210 carries out image scan processing 211, scanning in image(s) of original(s) placed on original stage(s). At such time, firmware 230 carries out scan control 231, controlling image scan processing 211 so as to cause scanning of scan region(s) determined in correspondence to original size(s) specified by user(s). Original scan image data 251 output from scanner circuitry 210 is temporarily stored in storage device(s) 250 such as, for example, RAM and/or hard drive(s).

ASIC 220 reads scan image data 251 from storage device 250 and moreover carries out image enlargement processing 221, enlarging such scan image data 251 by a certain amount (e.g., enlargement might be 105% when original size is A4, enlargement might be 109% when original size is Japanese postcard size, etc.). Enlarged image data 252 is temporarily stored in storage device 250. ASIC 220 thereafter reads enlarged image data 252 from storage device 250 and moreover carries out color conversion/halftoning processing 222, converting such enlarged image data 252 (e.g., RGB full-color image data) into enlarged dot image data 253 (e.g., CMYK binary image data) by means of which the initial image is represented in simulated fashion through employment of an ink dot matrix. Enlarged dot image data 253 is temporarily stored in storage device 250. It so happens that in the present embodiment ASIC(s) is/are employed for carrying out image enlargement processing 221 and color conversion/halftoning processing 222, but this need not be the case, that being merely presented by way of example. It is also possible to carry out either image enlargement processing 221 or color conversion/halftoning processing 222, or both image enlargement processing 221 and color conversion/halftoning processing 222, by, for example, executing firmware or other such computer program instead of or in combination with ASIC(s).

Firmware 230 reads enlarged dot image data 253 from storage device 250 and moreover carries out cropping processing 232, extracting as effective print image data 254 the portion(s) remaining after deletion of unwanted perimeter portion(s) from enlarged dot image data 253. Extracted print image data 254 is temporarily stored in storage device 250 and is thereafter transferred to print engine 240. Print engine 240 uses print image data 254 to drive printhead(s), as a result of which printout(s) is/are created.

Figure 17:
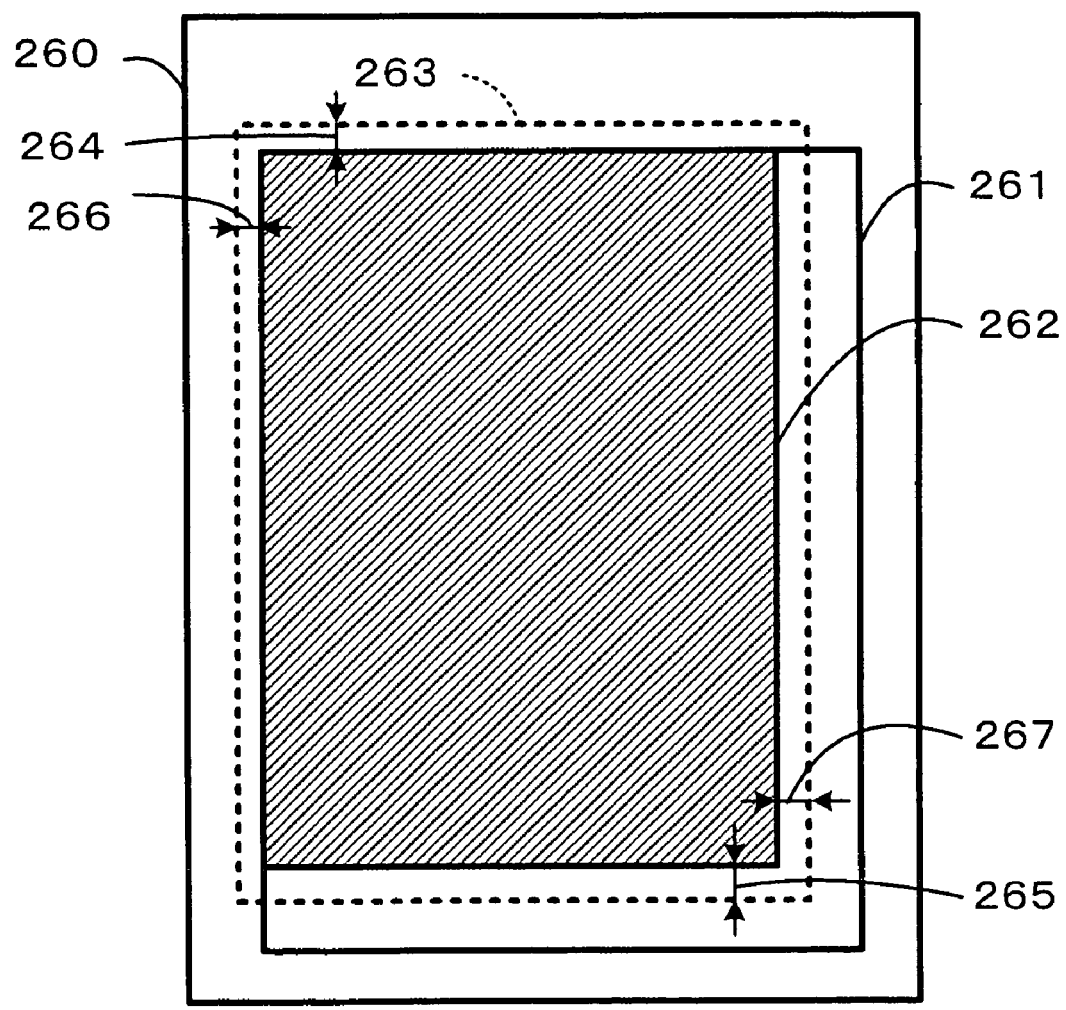
FIG. 17 is a plan view of an original stage for explaining scan region(s) in the context of four-sided borderless copying.

FIG. 17 shows a plan view of an original stage for explaining original stage scan region(s) scanned by means of scanner circuitry 210 in a situation where four-sided borderless copying is being carried out.

At FIG. 17, reference numeral 260 indicates an original stage frame, this frame being constituted by the hybrid printer housing. Captured within this frame 260 is plate glass original stage 261. A user might place an original of desired size on glass original stage 261, and might specify to the hybrid printer that the size of the original so placed is, for example, A4 or B5. While hybrid printer might not directly know the size or location of the original actually placed on glass original stage 261, it might assume that an original 262 of size as specified by the user has been placed on glass original stage 261 at standard location and in standard orientation (e.g., as shown by way of example in FIG. 17, at such location and in such orientation as to cause the upper left corner, top (short) edge, and left (long) edge of that original 262 to respectively match the upper left corner, top (short) edge, and left (long) edge of glass original stage 261). An original 262 assumed to exist in this fashion will hereinafter be distinguished from an actual original by referring to same as an "assumed original."

Enlarging the region occupied by assumed original 262 on glass original stage 261 somewhat outward therefrom so as to accommodate top, bottom, left, and right margins 264, 265, 266, and 267 of prescribed dimension(s), the hybrid printer establishes such enlarged region 263 as scan region. In other words, scan region 263 is established in such manner as to cause assumed original 262 to be completely enclosed by scan region 263 with sufficient clearance therebetween to accommodate top, bottom, left, and right margins 264, 265, 266. By thus causing scan region 263 to be established such that it is larger by appropriate amount(s) than assumed original 262, the actual original will in most cases, so long as the size of the actual original placed on original stage 261 matches the size specified by the user, lie within the actual scan region (meaning that the entire region of the actual original will be scanned) despite any slight deviation which may exist in the position of the actual scan region relative to established scan region 263 attributable to the mechanical precision of the scanner mechanism and/or despite what could be moderate deviation in the orientation and location of the actual original relative to standard orientation and location. A value of 1.5 mm might, for example, be employed for top and left margins 264 and 266; a value of 3 mm might, for example, be employed for bottom and right margins 265 and 267.

The hybrid printer scans scan region 263, which is somewhat larger than assumed original 262 as has been described, the image data corresponding to this scan region 263 being output as scan image data 251 shown in FIG. 16. As described above, the scan image data 251 which is so output will in most cases contain image data for the entire region of the actual original placed on glass original stage 261.

Figure 18:
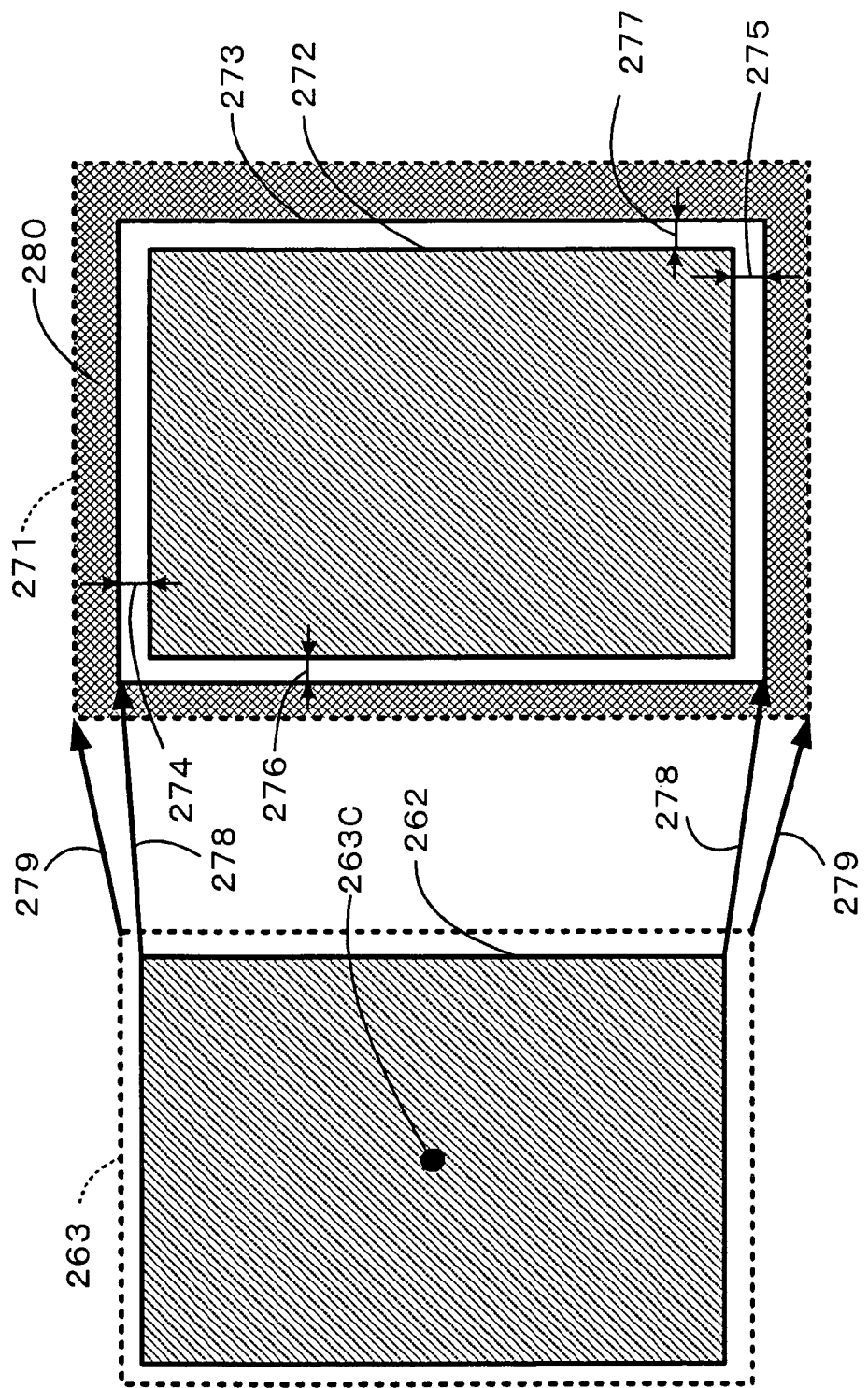
FIG. 18 is a drawing showing image size(s) for explaining image enlargement processing 221 and cropping processing 232 in the context of four-sided borderless copying.

FIG. 18 is a drawing showing image size(s) for explaining image enlargement processing 221 and cropping processing 232 in the context of four-sided borderless copying.

As indicated by arrow 279 in FIG. 18, during image enlargement processing 221, image data corresponding to scan region 263 (scan image data 251 at FIG. 16) is enlarged at prescribed enlargement about center point 263C thereof, transforming it into image data of size as indicated at region (hereinafter "enlarged scan region") 271 shown in the drawing. Image data corresponding to this enlarged scan region 271 is the enlarged image data 252 shown in FIG. 16. Within the image data corresponding to this enlarged scan region 271, image data corresponding to initial assumed original 262 is enlarged, as indicated by arrow 278, to become image data of size as at region (hereinafter "enlarged paper region") 273, which is somewhat larger in size than print media (printing paper) 272 previously specified by the user. This enlarged paper region 273 is equal to a size obtainable by enlarging the size of print media 272 outward by amount(s) sufficient to accommodate top, bottom, left, and right printer margins 274, 275, 276, and 277 of prescribed dimension(s).

Thereafter, during cropping processing 232, that portion 280 (indicated by cross-hatching at FIG. 18) of the image data corresponding to enlarged scan region 271 that lies to the exterior of enlarged paper region 273 is deleted, only the image data corresponding to enlarged paper region 273 being extracted therefrom. The image data corresponding to enlarged paper region 273 extracted in this fashion is the print image data 254 shown in FIG. 16. This print image data 254 is transferred to print engine 340, where it is used to drive the printhead.

As described above, print image data 254 (image data corresponding to enlarged paper region 273) is equal to a size obtainable by enlarging the size of print media 272 outward by amount(s) sufficient to accommodate top, bottom, left, and right printer margins 274, 275, 276, and 277 of prescribed dimension(s). As a result, even if the position of the actual print media as supplied to the platen deviates somewhat from the standard position therefor due to the mechanical precision of the paper feed mechanism of print engine 340, the actual print media will in most cases lie completely within the region (enlarged paper region 273) on the platen occupied by the print image data, this being the region which is scanned by the printhead. As a result, four-sided borderless copying is made possible. Here, as specific examples of the dimensions of the aforementioned top, bottom, left, and right printer margins 274, 275, 276, and 277, 3 mm may be employed therefor.

While it need not always be so, the size of the original and the size of the print media will in many cases be the same. Where the two are the same, specific examples of values of enlargements employable during image enlargement processing 221 might be 105% where the specified size of the original is for example standard A4 size (210 mm×297 mm), or 109% where the specified size of the original is for example the Japanese postcard size (100 mm×148 mm).

Figure 19:
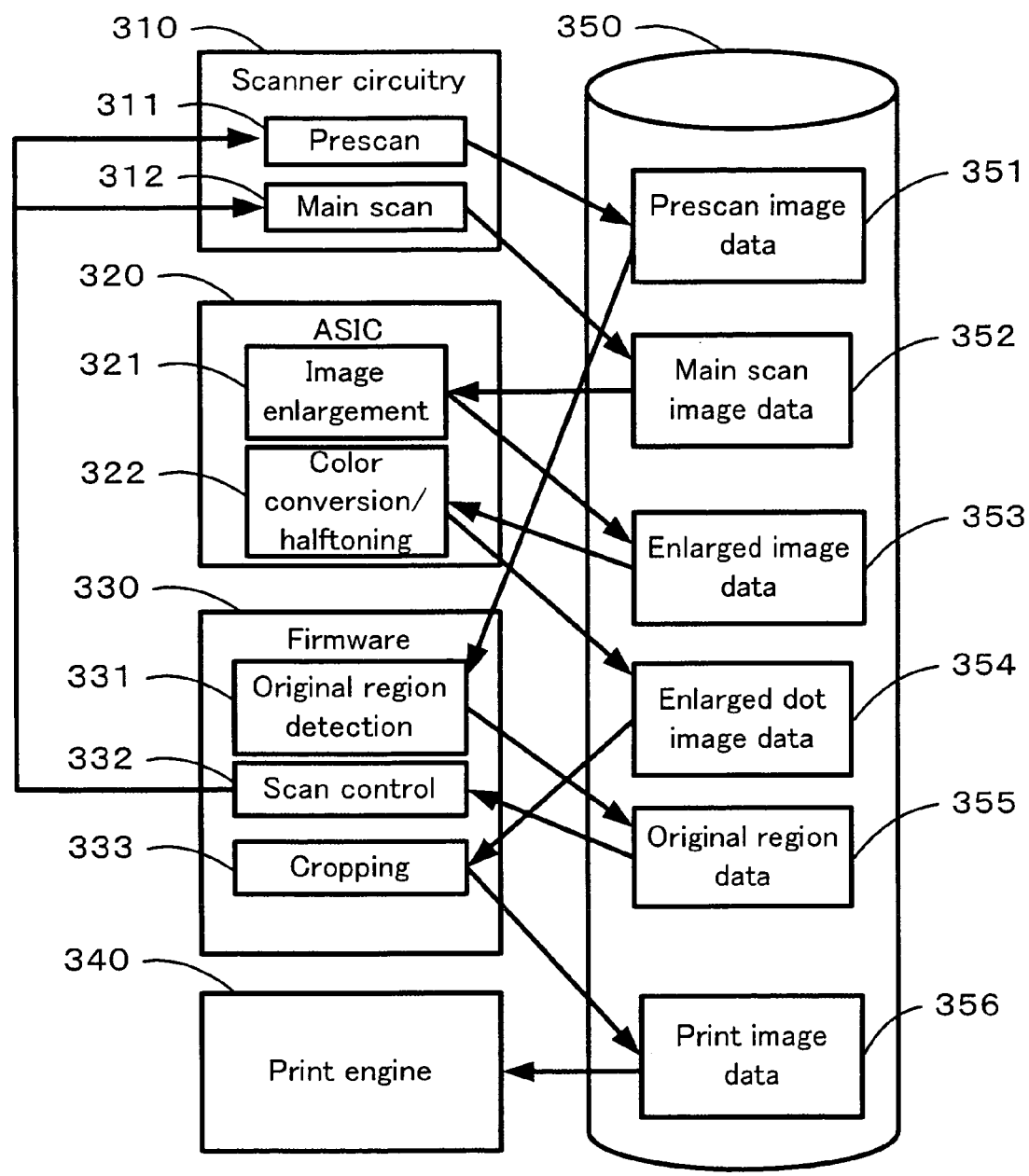
FIG. 19 is a block diagram showing constitution and function of the principal parts of yet another embodiment of a hybrid printer in accordance with the present invention.

FIG. 19 shows constitution and function of the principal parts of yet another embodiment of a hybrid printer in accordance with the present invention.

This hybrid printer has mechanical construction as is shown in FIG. 1; furthermore, as shown in FIG. 19, there are at the interior thereof scanner circuitry 310, ASIC(s) (Application Specified IC(s)) 320, firmware (i.e., microprocessor(s) executing firmware) 330, print engine(s) 340, and storage device(s) 350.

Scanner circuitry 310 is capable of carrying out prescan processing 311 and/or main scan processing 312 in manual and/or automatic fashion. In the event that four-sided borderless copying is to be carried out, scanner circuitry 310 might automatically carry out prescan processing 311 and main scan processing 312, in this order, in continuous and automated fashion. At time(s) when prescan processing 311 and/or main scan processing 312 is/are being carried out, firmware 330 carries out scan control 231, controlling scan region(s) and resolution(s) in connection with the respective types of processing.

During prescan processing 351, the entire region which could conceivably be occupied by original(s) (e.g., the entire region of the glass original stage) is scanned at high speed at some prescribed low resolution (e.g., 50 dpi). Prescan image data 351 corresponding to the entire original stage and obtained as a result of prescan processing 311 is temporarily stored in storage device(s) 350 such as, for example, RAM and/or hard drive(s).

After prescan processing 351 has been carried out, firmware 330 reads prescan image data 351 from storage device 350 and moreover carries out original region detection processing 331 with respect to prescan image data 351, detecting region(s) on the original stage at which actual original(s) exist.

Any of a variety of methods may be employed as method for original region detection processing 331. The procedure listed at (1) through (5), below, represents one of such methods, which is presented here by way of example.

(1) Brightness values of respective pixels of prescan image data 351 are binarized based on prescribed threshold(s). Where, for example, brightness values range from 0 to 255, a threshold of 210 might, for example, be employed.

(2) The binary prescan image data 351 is subjected to downsampling. For example, each 4×4=16 pixels of binary prescan image data 351 can, by subjecting same to OR operation(s), be converted into 1 pixel of downsampled binary prescan image data 351. In this example, the resolution of binary prescan image data 351 is reduced to one-fourth of its initial resolution. Note that, hereinafter, the initial resolution of binary prescan image data 351 will be referred to as the second resolution thereof, and the resolution obtained as a result of downsampling will be referred to as the first resolution thereof.

(3) First-resolution binary prescan image data 351 obtained by downsampling is subjected to labeling processing. While it is possible to use any of a variety of algorithms for labeling processing, as one example thereof, two-pass-type labeling processing based on 8-connectivity might be employed. As a result of labeling processing, groups of mutually connected pixels for which pixel value is equal to 1 (labeled region(s) of pixel value 1) are extracted from first-resolution binary prescan image data 351.

(4) Labeled region(s) which have been extracted are subjected to noise reduction processing, noise region(s) present due to inclusion of dirt, dust, and/or the like during prescan of the original being removed from labeled region(s).

(5) Following noise reduction processing, the smallest rectangular region that completely encompasses the labeled region(s) is extracted as the original region.

After the original region has been detected within prescan image data 351 in such fashion, original region data 355 indicating the position of that original region on the original stage is temporarily stored at storage device 350. Prescan image data 351 is deleted from storage device 350.

Main scan processing 312, performed by scanner circuitry 310, is automatically executed thereafter. During main scan processing 312, firmware 330 uses original region data 355 to control the scan region so as to cause the entire expanse of the detected original region to be completely scanned (in other words, so as to cause the detected original region to be completely enclosed by the scan region). Here, the scan region may be controlled so as to cause it to exactly match the detected original region or may be controlled so as to cause it to be somewhat larger than the detected original region as sufficient to accommodate prescribed scanner margin(s). Main scan image data 352 obtained as a result of main scan processing 312 is temporarily stored at storage device 350.

ASIC 320 reads main scan image data 352 from storage device 350 and moreover carries out image enlargement processing 321, enlarging main scan image data 352 by a certain amount. Enlarged image data 352 is temporarily stored in storage device 350. ASIC 320 thereafter reads enlarged image data 353 from storage device 350 and moreover carries out color conversion/halftoning processing 322, converting such enlarged image data 353 (e.g., RGB full-color image data) into enlarged dot image data 354 (e.g., CMYK binary image data) by means of which the initial image is represented in simulated fashion through employment of an ink dot matrix. Enlarged dot image data 354 is temporarily stored in storage device 350. Note that either image enlargement processing 321 or color conversion/halftoning processing 322, or both image enlargement processing 321 and color conversion/halftoning processing 322, may be carried out by, for example, executing firmware or other such computer program instead of or in combination with ASIC(s).

Firmware 330 reads enlarged dot image data 354 from storage device 350 and moreover carries out cropping processing 333, deleting unwanted perimeter portion(s) from enlarged dot image data 354 and extracting as effective print image data 356 the portion(s) which remain. Extracted print image data 356 is temporarily stored in storage device 350 and is thereafter transferred to print engine 340. Print engine 340 uses print image data 356 to drive printhead(s), as a result of which printout(s) is/are created.

Figure 20:
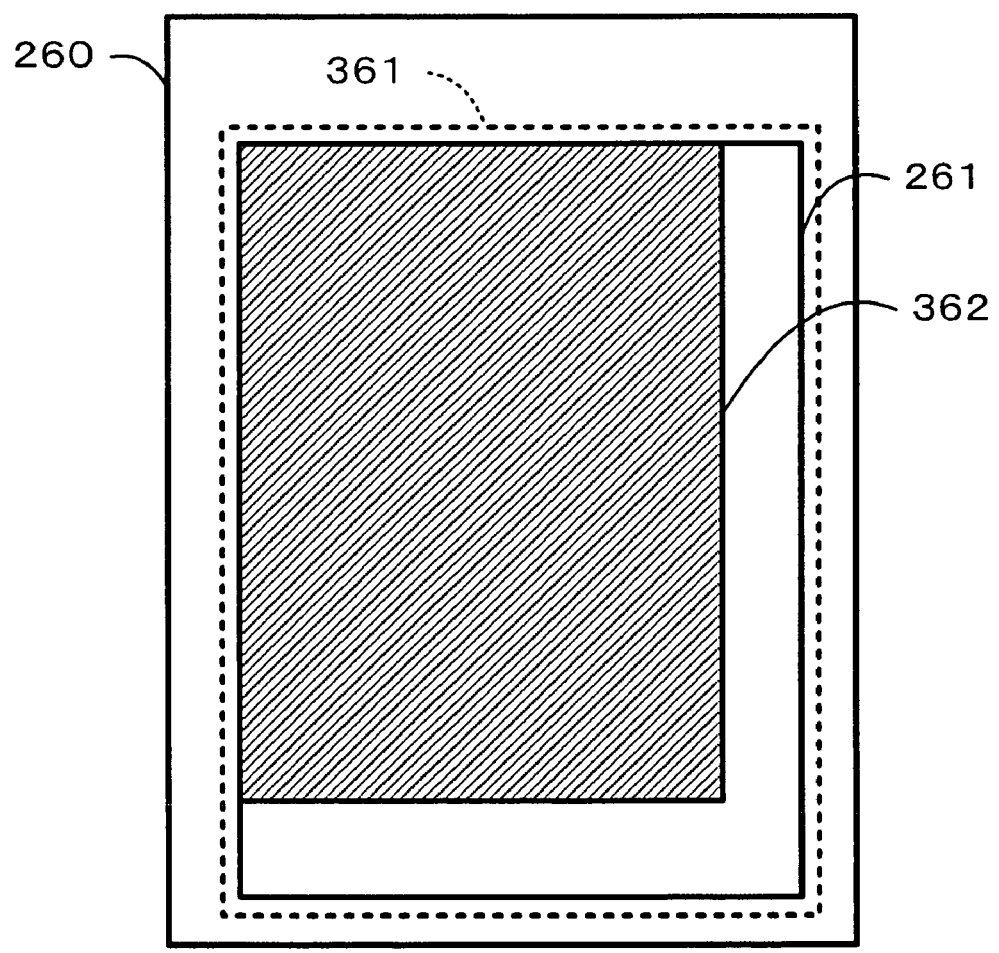
FIG. 20 is a plan view of an original stage for explaining original stage scan region(s) during prescan and during main scan in the context of four-sided borderless copying.

FIG. 20 shows a plan view of an original stage for explaining scan region(s) in connection with prescan and main scan in the context of four-sided borderless copying.

At FIG. 20, plate glass original stage 261 is captured within original stage frame 260, this frame being constituted by the hybrid printer housing. A user might place an original 362 of desired size on glass original stage 261, and might request that the hybrid printer carry out four-sided borderless copying. Upon so doing, the hybrid printer might carry out the aforementioned prescan processing 311. The scan region employed during prescan processing 311 is set so as to be a region which includes the entire region that could conceivably be occupied by original(s) 362, e.g., a region 361 somewhat larger than glass original stage 261. The hybrid printer scans this prescan scan region 361 at high-speed and outputs image data corresponding to this scan region 361 (prescan image 351 at FIG. 19).

Next, the aforementioned original region detection processing 331 is carried out, actual original region 362 being detected within scan region 361. The aforementioned main scan processing 312 is thereafter carried out, detected original region 362 being scanned. While the scan region employed during main scan processing 312, even when found to be exactly identical to original region 362, may be made somewhat larger than same in order to accommodate prescribed scanner margin(s) (i.e., the only requirement here being that original region 362 be completely enclosed by scan region 263), the description which follows is, for convenience of description, predicated upon a situation in which a scan region exactly identical to original region 362 is employed.

Figure 21:
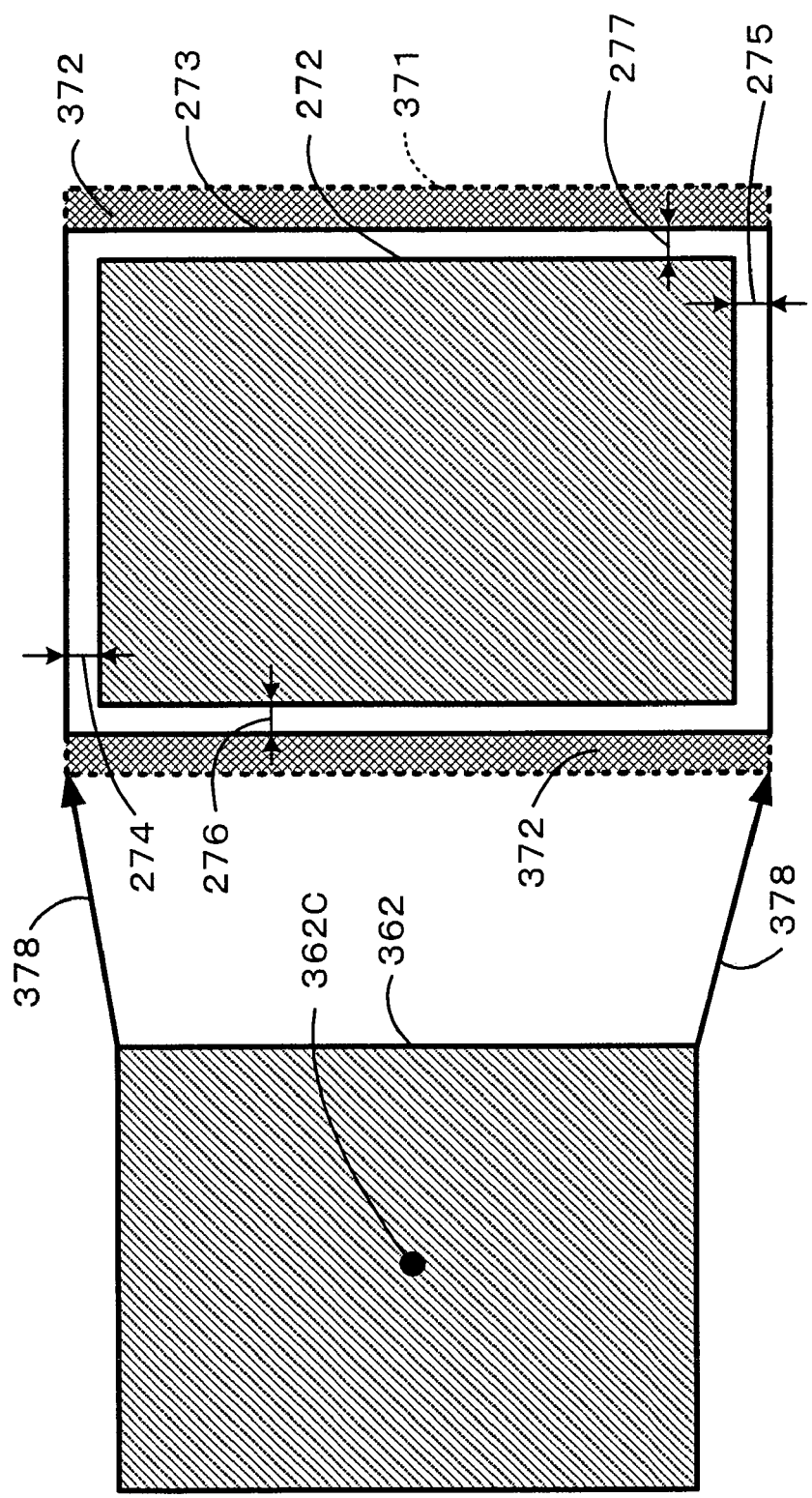
FIG. 21 is a drawing showing image size(s) for explaining image enlargement processing 321 and cropping processing 333 in the context of four-sided borderless copying.

FIG. 21 is a drawing showing image size(s) for explaining image enlargement processing 321 and cropping processing 333 in the context of four-sided borderless copying.

As indicated by arrow 378 in FIG. 21, during image enlargement processing 321, image data corresponding to original region 362 (main scan image data 352 at FIG. 19) is enlarged about center point 362C thereof, transforming it into image data of size such as that of region (hereinafter referred to as "enlarged original region") 371 shown in the drawing. Image data corresponding to this enlarged original region 371 is the enlarged image data 353 shown in FIG. 19. The horizontal dimension or the vertical dimension (preferably whichever is shorter) of this enlarged original region 371 is equal to that of a region (hereinafter "enlarged paper region") 273 somewhat larger than print media (printing paper) 272 previously specified by the user. This enlarged paper region 273 is equal to a size obtainable by enlarging the size of print media (printing paper) 272 outward by amount(s) sufficient to accommodate top, bottom, left, and right printer margins 274, 275, 276, and 277 of prescribed dimension(s). In the event that the aspect ratio of original region 362 is the same as that of print media 272, enlarged original region 371 will match enlarged paper region 273. But where, as at the example shown in FIG. 21, the aspect ratio of original region 362 is different from that of print media 272, enlarged original region 371 will be larger, in the horizontal or the vertical dimension, than enlarged paper region 273. Here, as specific examples of the dimensions of the aforementioned top, bottom, left, and right printer margins 274, 275, 276, and 277, 3 mm may be employed therefor.

Thereafter, during cropping processing 333, that portion 372 (indicated by cross-hatching at FIG. 21) of the image data corresponding to enlarged original region 371 that lies to the exterior of enlarged paper region 273 is deleted, only the image data corresponding to enlarged paper region 273 being extracted therefrom. The image data corresponding to enlarged paper region 273 extracted in this fashion is the print image data 356 shown in FIG. 21. This print image data 356 is transferred to print engine 340, where it is used to drive the printhead.

Whereas a number of preferred embodiments of the present invention have been described above, these have been presented as examples for purposes of describing the present invention and without intent to limit the scope of the present invention to these embodiments alone. The present invention may be carried out in the context of a wide variety of other modes and embodiments.

What is claimed is:

1. A hybrid printer comprising:
   an original stage;
   a scanner scanning a scan region of the original stage and outputting image data corresponding to the scan region;
   a controller controlling the scan region;
   an image-processor processing the image data output from the scanner, and
   a printer using the image data output by the processor to carry out printing at print medium;
   wherein the controller has means for controlling the scan region so as to cause the scan region to match or be larger than an original region detected or assumed to exist at the original stage in order to permit the scan region to encompass the original region, wherein the processor has means for enlarging, so as to be larger than the size of the print medium, the image data corresponding to the original region encompassed by the image data corresponding to the scan region from the scanner; and wherein the print engine carries out printing at the print medium using the image data corresponding to the original region enlarged by the processor so as to be larger than the size of the print medium.

2. A hybrid printer according to claim 1 further comprising:

an original region assumer establishing the original region which is assumed to exist based on previously specified original size, wherein the controller controls the scan region so as to cause the scan region to be a region enlarged outward to accommodate a prescribed top, bottom, left, and right margins around the assumed original region established by the original region assumer.

3. A hybrid printer according to claim 1 further comprising:

an original region detecting means detecting an actual original region at the original stage;

wherein the controller controls the scan region so as to cause the scan region to match the original region detected by the original region detecting means or to be a region enlarged outward to accommodate a prescribed top, bottom, left, and right margin around the detected original region.

4. A hybrid printer according to claim 3 wherein:

the scanner has a prescan means for scanning the original stage prior to scanning of the scan region and outputting the original stage image data, and the original region detecting means detects the original region or regions based on the original stage image data output by the prescan means.

5. A hybrid printer according to claim 1 wherein:

the processor further has a cropping means for cropping away, from the image data corresponding to the scan region, a subset thereof which is not image data corresponding to the original region, so as to extract therefrom a portion or portions of the image data corresponding to the original region.

6. A hybrid printer according to claim 1 further comprising:

a print start controller controlling a print start location of the print engine in correspondence to a magnification at which the image data corresponding to the original region is enlarged by the processor.

7. A hybrid printer comprising:

an original stage;

a scanner scanning a scan region of the original stage and outputting image data corresponding to the scan region, a controller controlling the scan region;

an image processor processing the image data output from the scanner, and printer using the image data output by the processor to carry out printing at a print medium;

wherein the controller has a means for controlling the scan region so as to cause the scan region to be smaller than an original region detected or assumed to exist at the original stage in order to permit the original region to encompass the scan region;

wherein the processor has a means for enlarging, so as to be larger than the size of the print medium, the image data corresponding to the scan region from the scanner; and wherein the print engine carries out printing at the print medium by using the image data corresponding to the scan region enlarged by the processor so as to be larger than the size of the print medium.

8. A hybrid printer according to claim 7 wherein:

the controller controls the scan region so as to cause the scan region to be a region reduced inward from the original region by the prescribed scanner margin;

the processor enlarges the image data corresponding to the scan region so as to cause the image data corresponding to the scan region to be the size obtainable by enlarging outward to accommodate the prescribed printer margin around the size of at least one of the print medium; and the scanner margin is smaller than the printer margin.

9. A hybrid printer according to claim 7 further comprising:

a print start controller controlling a print start location of the print engine in correspondence to a magnification at which the image data corresponding to the original region is enlarged by the processor.

10. A hybrid printer comprising:

an original stage;

a scanner scanning a scan region of the original stage and outputting image data corresponding to the scan region;

a controller controlling the scan region;

an image-processor the image data output from the scanner, and a printer using the image data output by the processor to carry out printing at print medium;

wherein the controller controls the scan region so as to cause the scan region to match or be larger than an original region detected or assumed to exist at the original stage in order to permit the scan region to encompass the original region, wherein the processor enlarges, so as to be larger than size of the print medium, the image data corresponding to the original region encompassed by the image data corresponding to the scan region from the scanner; and wherein the print engine carries out printing at the print medium using the image data corresponding to the original region enlarged by the processor so as to be larger than the size of the print medium.

11. A hybrid printer according to claim 10 further comprising:

an original region assumer establishing the original region which is assumed to exist based on previously specified original size, wherein the controller controls the scan region so as to cause the scan region to be a region enlarged outward to accommodate a prescribed top, bottom, left, and right margins around the assumed original region established by the original region assumer.

12. A hybrid printer according to claim 10 further comprising:

an original region detector detecting an actual original region at the original stage;

wherein the controller controls the scan region so as to cause the scan region to match the original region detected by the original region detector or to be a region enlarged outward to accommodate a prescribed top, bottom, left and right margins around the detected original region.

13. A hybrid printer according to claim 12 wherein:

the scanner prescans the original stage prior to scanning of the region and outputting the original stage image data, and the original region detector detects the original region or regions based on the original stage image data output by the scanner.

14. A hybrid printer according to claim 10 wherein:

the processor further crops away, from the image data corresponding to the scan region, a subset thereof which is not image data corresponding to the original region, so as to extract therefrom a portion or portions of the image data corresponding to the original region.

15. A hybrid printer according to claim 10 further comprising:

a print start controller controlling a print start location at the print engine in correspondence to a magnification at which the image data corresponding to the original region is enlarged by the processor.

16. A hybrid printer comprising:

an original stage;

a scanner scanning a scan region of the original stage and outputting image data corresponding to the scan region, a controller controlling the scan region;

an image processor processing the image data output the scanner, and printer using the image data output by the processor to carry out printing at a print medium;

wherein the controller controls the scan region so as to cause the scan region to be smaller than an original region detected or assumed to exist at the original stage in order to permit the original region to encompass the scan region;

wherein the processor enlarges, so as to be larger than the size of the print medium, the image data corresponding to the scan region from the scanner; and wherein the print engine carries out printing at the print medium by using the image data corresponding to the scan region enlarged by the processor so as to be larger than the size of the print medium.

17. A hybrid printer according to claim 16 wherein:

the controller controls the scan region so as to scan the region reduced inward by the prescribed scanner margin;

the processor enlarges the image data corresponding to the scan region so as to obtain the size enlarged outward by the prescribed printer margin from the size of at least one of the print medium; and the scanner margin is smaller than the printer margin.

18. A hybrid printer according to claim 16 further comprising:

a print start controller controlling a print start location of the print engine in correspondence to a magnification at which the image data corresponding to the original region is enlarged by the processor.

* * * * *